US011550806B2

(12) United States Patent
Costantino et al.

(10) Patent No.: US 11,550,806 B2
(45) Date of Patent: *Jan. 10, 2023

(54) ANALYZING VEHICLES BASED ON COMMON CIRCUIT ELEMENTS

(71) Applicant: Snap-on Incorporated, Kenosha, WI (US)

(72) Inventors: David Costantino, San Diego, CA (US); Patrick S. Merg, Hollister, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/111,640

(22) Filed: Dec. 4, 2020

(65) Prior Publication Data

US 2021/0089522 A1 Mar. 25, 2021

Related U.S. Application Data

(63) Continuation of application No. 15/618,674, filed on Jun. 9, 2017, now Pat. No. 10,909,132.

(51) Int. Cl.
*G06F 16/20* (2019.01)
*G06F 16/248* (2019.01)
(Continued)

(52) U.S. Cl.
CPC .......... *G06F 16/248* (2019.01); *G06F 16/951* (2019.01); *G06Q 10/20* (2013.01);
(Continued)

(58) Field of Classification Search
CPC . G07C 5/00; G07C 5/008; G07C 5/08; G07C 5/085; G06Q 10/20; G06F 16/248; G06F 16/951
See application file for complete search history.

(56) References Cited

U.S. PATENT DOCUMENTS 6,615,120 B1 9/2003 Rother
8,055,400 B2 11/2011 Grenn
(Continued)

OTHER PUBLICATIONS

International Search Report and Written Opinion for corresponding PCT application No. PCT/US2018/034900, dated Aug. 7, 2018.

*Primary Examiner* — Tarek Chbouki
(74) *Attorney, Agent, or Firm* — McDonnell Boehnen Hulbert & Berghoff LLP

(57) ABSTRACT

A processor may receive a request including a vehicle identifier, a first symptom identifier, and a second symptom identifier. In response to receiving the request, the processor may determine a circuit element identifier to include in a reply to the request. To do so, the processor may make a determination that the received vehicle identifier matches or is mapped to a stored vehicle identifier, that the received first symptom identifier matches or is mapped to a stored first symptom identifier, and that the received second symptom identifier matches or is mapped to a stored second symptom identifier. In response to making the determination, the processor may determine that a particular circuit element identifier is the circuit element identifier to include based on the particular circuit element identifier being mapped to these stored identifiers. Then, the processor may generate and subsequently output the reply including the determined circuit element identifier.

28 Claims, 12 Drawing Sheets

(51) Int. Cl.
    *G07C 5/08*           (2006.01)
    *G06F 16/951*      (2019.01)
    *G07C 5/00*           (2006.01)
    *G06Q 10/00*       (2012.01)

(52) U.S. Cl.
    CPC ............... *G07C 5/00* (2013.01); *G07C 5/008* (2013.01); *G07C 5/08* (2013.01); *G07C 5/085* (2013.01)

(56) References Cited

U.S. PATENT DOCUMENTS

| | | |
|---|---|---|
| 8,732,112 B2 | 5/2014 | Singh et al. |
| 9,165,413 B2 | 10/2015 | Jones et al. |
| 2007/0295800 A1 | 12/2007 | Saats |
| 2009/0089134 A1 | 4/2009 | Uyeki |
| 2010/0138701 A1 | 6/2010 | Costantino |
| 2010/0174446 A1 | 7/2010 | Andreasen et al. |
| 2012/0210160 A1* | 8/2012 | Fuhrman ............ G05B 19/0428 714/4.12 |
| 2015/0039176 A1 | 2/2015 | Fish |
| 2015/0324363 A1 | 11/2015 | Merg |
| 2016/0055684 A1 | 2/2016 | Chen |
| 2016/0071334 A1 | 3/2016 | Johnson et al. |
| 2016/0071336 A1 | 3/2016 | Owen et al. |
| 2017/0098200 A1 | 4/2017 | Merg et al. |
| 2017/0132576 A1 | 5/2017 | Merg et al. |
| 2017/0148233 A1 | 5/2017 | Rajpathak et al. |
| 2017/0206718 A1 | 7/2017 | Kapoor et al. |
| 2018/0286148 A1 | 10/2018 | Leonov et al. |
| 2018/0357288 A1 | 12/2018 | Costantino et al. |

* cited by examiner

RTR Car Repair, Tuscaloosa, Alabama — February 18, 2009 ← 404

Customer: C. N. Saban ← 406

Vehicle: 1997 Ford Crown Vic. 4.6L, V8, (W), Auto Trans. VIN: 1GYSP74WXVR123456 ← 432

Complaint: Failed emissions test. Check engine light on. Change oil and filter. ← 410

Service procedure: ← 414

| | Time | Rate | Cost |
|---|---|---|---|
| Check DTC – P0171 and P0174. (C45) <u>424</u> | 0.3 | $100 | $30 |
| Check system vacuum and fuel pressures 30/40 PSI. (C117, C245) MAF readings bad. (C772) | 0.5 | $100 | $50 |
| Cleaned MAF, retested, recalibrated MAF. Verify repair. (C415, R550) | 1.0 | $100 | $100 |
| Change engine oil and filter. (C085) <u>426</u> | 0.2 | $100 | $20 |
| Lubricate chassis. (C086) | 0.5 | $50 | $25 |
| Check DTC. Diagnose DTC 117. (C100) <u>428</u> | 0.2 | $50 | $10 |
| Coolant sensor short. R/R coolant sensor. (R199) | 0.4 | $100 | $40 |
| | 0.4 | $100 | $40 |
| Verify repair. (V18) | 0.2 | $100 | $20 |

| Part Description | Part # | Price |
|---|---|---|
| MAF sensor | 6012980 | $89.99 |
| Oil Filter | 6043011 | $19.99 |
| ECT sensor | 6563772 | $73.99 |

Sub-total $183.97
Labor $335.00
Tax $51.90
Total $570.87 ← 416

Mileage: 23,411 ← 430

| | |
|---|---|
| RO ID: 3915  Repair year 2009 Y/M/M/E: 1997/Ford/Crown Victoria/4.6L, V8, VIN (W) | |
| Work Requested: Customer states the vehicle has failed state emissions certification. Please diagnose and advise. Customer states please replace the MAF sensor. | 508 |
| Work Performed: Technician scan tested and verified the DTC P0171 and DTC P0174. Tested for vacuum leaks and found none at the time. Tested the fuel pump pressure found [[30]] PSI and [[40]] PSI unregulated. Checked the scan data. Found the MAF sensor readings incorrectly. Removed the MAF sensor and cleaned. Found the MAF sensor is not damaged. Recommend recalibration of MAF sensor. Recalibrated MAF sensor. Found the MAF sensor readings correctly. | 510 |
| Meta-data: Customer complaint: failed state emissions certification<br>Pcode: P0171, P0174<br>Component: mass airflow sensor (MAF) (MAF sensor) | 512 |
| Usage indicator: Distance = 23,411 miles | 514 |

RECEIVE, BY AT LEAST ONE PROCESSOR CONFIGURED TO SEARCH A COMPUTER-READABLE MEMORY, A REQUEST COMPRISING A VEHICLE IDENTIFIER, A FIRST SYMPTOM IDENTIFIER, AND A SECOND SYMPTOM IDENTIFIER, WHERE THE COMPUTER-READABLE MEMORY HAS STORED THEREON A PARTICULAR CIRCUIT ELEMENT IDENTIFIER THAT IS MAPPED TO A STORED VEHICLE IDENTIFIER, A STORED FIRST SYMPTOM IDENTIFIER, AND A STORED SECOND SYMPTOM IDENTIFIER, WHERE THE STORED VEHICLE IDENTIFIER REPRESENTS A PARTICULAR VEHICLE HAVING AT LEAST FIRST AND SECOND VEHICLE COMPONENTS, WHERE THE STORED FIRST SYMPTOM IDENTIFIER REPRESENTS A FIRST SYMPTOM THAT THE FIRST VEHICLE COMPONENT CAN CAUSE THE PARTICULAR VEHICLE TO EXHIBIT, WHERE THE STORED SECOND SYMPTOM IDENTIFIER REPRESENTS A SECOND SYMPTOM THAT THE SECOND VEHICLE COMPONENT CAN CAUSE THE PARTICULAR VEHICLE TO EXHIBIT, AND WHERE THE PARTICULAR CIRCUIT ELEMENT IDENTIFIER REPRESENTS A CIRCUIT ELEMENT THAT IS CONNECTED TO OR IS A PART OF THE FIRST VEHICLE COMPONENT AND THAT IS CONNECTED TO OR IS A PART OF THE SECOND VEHICLE COMPONENT

⎩ 602

IN RESPONSE TO RECEIVING THE REQUEST, DETERMINE, BY THE AT LEAST ONE PROCESSOR, A CIRCUIT ELEMENT IDENTIFIER TO INCLUDE IN A REPLY TO THE REQUEST, WHERE DETERMINING THE CIRCUIT ELEMENT IDENTIFIER TO INCLUDE COMPRISES: (I) MAKING A DETERMINATION THAT THE RECEIVED VEHICLE IDENTIFIER MATCHES OR IS MAPPED TO THE STORED VEHICLE IDENTIFIER, THAT THE RECEIVED FIRST SYMPTOM IDENTIFIER MATCHES OR IS MAPPED TO THE STORED FIRST SYMPTOM IDENTIFIER, AND THAT THE RECEIVED SECOND SYMPTOM IDENTIFIER MATCHES OR IS MAPPED TO THE STORED SECOND SYMPTOM IDENTIFIER, AND (II) IN RESPONSE TO MAKING THE DETERMINATION, DETERMINING THAT THE PARTICULAR CIRCUIT ELEMENT IDENTIFIER IS THE CIRCUIT ELEMENT IDENTIFIER TO INCLUDE BASED ON THE PARTICULAR CIRCUIT ELEMENT IDENTIFIER BEING MAPPED TO THE STORED VEHICLE IDENTIFIER, THE STORED FIRST SYMPTOM IDENTIFIER, AND THE STORED SECOND SYMPTOM IDENTIFIER

⎩ 604

GENERATE, BY THE AT LEAST ONE PROCESSOR, THE REPLY TO THE REQUEST, WHERE GENERATING THE REPLY COMPRISES GENERATING THE REPLY TO INCLUDE THE DETERMINED CIRCUIT ELEMENT IDENTIFIER

⎩ 606

OUTPUT, BY THE AT LEAST ONE PROCESSOR, THE GENERATED REPLY TO THE REQUEST

| VEHICLE IDENTIFIER | SYMPTOM IDENTIFIER #1 | SYMPTOM IDENTIFIER #2 | CIRCUIT ELEMENT IDENTIFIER |
|---|---|---|---|
| 2010 TOYOTA CAMRY | P0301: CYLINDER #1 MISFIRE | P0306: CYLINDER #6 MISFIRE | 20A IG2 FUSE |
| 2010 TOYOTA CAMRY | POWER SEAT ADJUSTMENT | BLOWER MOTOR MALFUNCTION | E3 GROUND POINT |
| 2010 TOYOTA CAMRY | CLOCK MALFUNCTION | FOG LIGHTS MALFUNCTION | 10A DOME FUSE |

FIG. 8

| VEHICLE IDENTIFIER | SYMPTOM IDENTIFIER #1 | SYMPTOM IDENTIFIER #2 | CIRCUIT ELEMENT IDENTIFIER |
|---|---|---|---|
| 2010 TOYOTA CAMRY | P0301: CYLINDER #1 MISFIRE | P0306: CYLINDER #6 MISFIRE | 20A IG2 FUSE |
| 2010 TOYOTA CAMRY | POWER SEAT ADJUSTMENT | BLOWER MOTOR MALFUNCTION | E3 GROUND POINT |
| 2010 TOYOTA CAMRY | CLOCK MALFUNCTION | FOG LIGHTS MALFUNCTION | 10A DOME FUSE |

FIG. 10

```
┌─────────────────────────────────────────────────────────────┐
│ RECEIVE, BY AT LEAST ONE PROCESSOR CONFIGURED TO SEARCH A   │
│ COMPUTER-READABLE MEMORY, A REQUEST COMPRISING A VEHICLE    │
│ IDENTIFIER, A FIRST DIAGNOSTIC IDENTIFIER, AND A SECOND     │
│ DIAGNOSTIC IDENTIFIER, WHERE THE COMPUTER-READABLE MEMORY   │
│ HAS STORED THEREON A PARTICULAR CIRCUIT ELEMENT IDENTIFIER  │
│ THAT IS MAPPED TO A STORED VEHICLE IDENTIFIER, A STORED     │
│ FIRST DIAGNOSTIC IDENTIFIER, AND A STORED SECOND DIAGNOSTIC │
│ IDENTIFIER, WHERE THE STORED VEHICLE IDENTIFIER REPRESENTS  │
│ A PARTICULAR VEHICLE HAVING AT LEAST FIRST AND SECOND       │
│ VEHICLE COMPONENTS, WHERE THE STORED FIRST DIAGNOSTIC       │
│ IDENTIFIER IS ASSOCIATED WITH THE FIRST VEHICLE COMPONENT,  │
│ WHERE THE STORED SECOND DIAGNOSTIC IDENTIFIER IS ASSOCIATED │
│ WITH THE SECOND VEHICLE COMPONENT, AND WHERE THE PARTICULAR │
│ CIRCUIT ELEMENT IDENTIFIER REPRESENTS A CIRCUIT ELEMENT     │
│ THAT IS CONNECTED TO OR IS A PART OF THE FIRST VEHICLE      │
│ COMPONENT AND THAT IS CONNECTED TO OR IS A PART OF THE      │
│ SECOND VEHICLE COMPONENT                                    │
└─────────────────────────────────────────────────────────────┘
                            │
                            ▼                        └─ 1202
┌─────────────────────────────────────────────────────────────┐
│ IN RESPONSE TO RECEIVING THE REQUEST, DETERMINE, BY THE AT  │
│ LEAST ONE PROCESSOR, A CIRCUIT ELEMENT IDENTIFIER TO        │
│ INCLUDE IN A REPLY TO THE REQUEST, WHERE DETERMINING THE    │
│ CIRCUIT ELEMENT IDENTIFIER TO INCLUDE COMPRISES: (I) MAKING │
│ A DETERMINATION THAT THE RECEIVED VEHICLE IDENTIFIER        │
│ MATCHES OR IS MAPPED TO THE STORED VEHICLE IDENTIFIER, THAT │
│ THE RECEIVED FIRST DIAGNOSTIC IDENTIFIER MATCHES OR IS      │
│ MAPPED TO THE STORED FIRST DIAGNOSTIC IDENTIFIER, AND THAT  │
│ THE RECEIVED SECOND DIAGNOSTIC IDENTIFIER MATCHES OR IS     │
│ MAPPED TO THE STORED SECOND DIAGNOSTIC IDENTIFIER, AND (II) │
│ IN RESPONSE TO MAKING THE DETERMINATION, DETERMINING THAT   │
│ THE PARTICULAR CIRCUIT ELEMENT IDENTIFIER IS THE CIRCUIT    │
│ ELEMENT IDENTIFIER TO INCLUDE BASED ON THE PARTICULAR       │
│ CIRCUIT ELEMENT IDENTIFIER BEING MAPPED TO THE STORED       │
│ VEHICLE IDENTIFIER, THE STORED FIRST DIAGNOSTIC IDENTIFIER, │
│ AND THE STORED SECOND DIAGNOSTIC IDENTIFIER                 │
└─────────────────────────────────────────────────────────────┘
                            │
                            ▼                        └─ 1204
┌─────────────────────────────────────────────────────────────┐
│ GENERATE, BY THE AT LEAST ONE PROCESSOR, THE REPLY TO THE   │
│ REQUEST, WHERE GENERATING THE REPLY COMPRISES GENERATING    │
│ THE REPLY TO INCLUDE THE DETERMINED CIRCUIT ELEMENT         │
│ IDENTIFIER                                                  │
└─────────────────────────────────────────────────────────────┘
                            │
                            ▼                        └─ 1206
┌─────────────────────────────────────────────────────────────┐
│ OUTPUT, BY THE AT LEAST ONE PROCESSOR, THE GENERATED REPLY  │
│ TO THE REQUEST                                              │
└─────────────────────────────────────────────────────────────┘
                                                     └─ 1208
                        ↑
                       1200
```

FIG. 12

ANALYZING VEHICLES BASED ON COMMON CIRCUIT ELEMENTS

CROSS REFERENCE TO RELATED APPLICATION

This application is a continuation application of U.S. patent application Ser. No. 15/618,674, which was filed on Jun. 9, 2017 and was published as United States Patent Application Publication No. 2018/0357288 A1 on Dec. 13, 2018. U.S. patent application Ser. No. 15/618,674 and United States Patent Application Publication No. 2018/0357288 A1 are incorporated herein by reference.

INCORPORATION BY REFERENCE

U.S. patent application Ser. No. 14/270,994, filed on May 6, 2014, is incorporated herein by reference, as if fully set forth in this description.

BACKGROUND

Many products produced by manufacturers occasionally have to be repaired. But many owners are unequipped or otherwise unable to repair certain products. Therefore, such owners may depend on professional repair technicians to service or repair the owner's product.

In practice, the repair technicians could use a computing system to assist with the repair process. For instance, the computing system could capture and/or provide a variety of information regarding servicing or repairing a product. As an example, such information may include information regarding the type of repair or service needed or performed, among others.

Although the computing system could provide a variety of information, the computing system may not necessarily indicate the most optimal type of repair or service. For example, the computing system may fail to indicate a repair or service that could help resolve multiple problems simultaneously exhibited by a product. Consequently, it may be beneficial to repair technicians if a computing system could provide more optimal repair information.

OVERVIEW

Example implementations are described herein. In one aspect, a method is disclosed. The method involves receiving, by at least one processor configured to search a computer-readable memory, a request comprising a vehicle identifier, a first symptom identifier, and a second symptom identifier, where the computer-readable memory has stored thereon a particular circuit element identifier that is mapped to a stored vehicle identifier, a stored first symptom identifier, and a stored second symptom identifier, where the stored vehicle identifier represents a particular vehicle having at least first and second vehicle components, where the stored first symptom identifier represents a first symptom that the first vehicle component can cause the particular vehicle to exhibit, where the stored second symptom identifier represents a second symptom that the second vehicle component can cause the particular vehicle to exhibit, and where the particular circuit element identifier represents a circuit element that is connected to or is a part of the first vehicle component and that is connected to or is a part of the second vehicle component. The method additionally involves, in response to receiving the request, determining, by the at least one processor, a circuit element identifier to include in a reply to the request, where determining the circuit element identifier to include comprises: (i) making a determination that the received vehicle identifier matches or is mapped to the stored vehicle identifier, that the received first symptom identifier matches or is mapped to the stored first symptom identifier, and that the received second symptom identifier matches or is mapped to the stored second symptom identifier, and (ii) in response to making the determination, determining that the particular circuit element identifier is the circuit element identifier to include based on the particular circuit element identifier being mapped to the stored vehicle identifier, the stored first symptom identifier, and the stored second symptom identifier. The method further involves generating, by the at least one processor, the reply to the request, where generating the reply comprises generating the reply to include the determined circuit element identifier. The method yet further involves outputting, by the at least one processor, the generated reply to the request.

In another aspect, a computing system is disclosed. The computing system includes a computer-readable medium having stored thereon a particular circuit element identifier that is mapped to a stored vehicle identifier, a stored first symptom identifier, and a stored second symptom identifier, where the stored vehicle identifier represents a particular vehicle having at least first and second vehicle components, where the stored first symptom identifier represents a first symptom that the first vehicle component can cause the particular vehicle to exhibit, where the stored second symptom identifier represents a second symptom that the second vehicle component can cause the particular vehicle to exhibit, and where the particular circuit element identifier represents a circuit element that is connected to or is a part of the first vehicle component and that is connected to or is a part of the second vehicle component. The computing system also includes at least one processor configured to search the computer-readable memory. The computer system additionally includes program instruction stored on the computer-readable medium and executable by the at least one processor to receive a request comprising a vehicle identifier, a first symptom identifier, and a second symptom identifier. The program instructions are also executable to, in response to receiving the request, determine a circuit element identifier to include in a reply to the request by (i) making a determination that the received vehicle identifier matches or is mapped to the stored vehicle identifier, that the received first symptom identifier matches or is mapped to the stored first symptom identifier, and that the received second symptom identifier matches or is mapped to the stored second symptom identifier, and (ii) in response to making the determination, determining that the particular circuit element identifier is the circuit element identifier to include based on the particular circuit element identifier being mapped to the stored vehicle identifier, the stored first symptom identifier, and the stored second symptom identifier. The program instructions are additionally executable to generate the reply to include the determined circuit element identifier. The program instructions are further executable to output the generated reply to the request.

In yet another aspect, another method is disclosed. The method involves receiving, by at least one processor configured to search a computer-readable memory, a request comprising a vehicle identifier, a first diagnostic identifier, and a second diagnostic identifier, where the computer-readable memory has stored thereon a particular circuit element identifier that is mapped to a stored vehicle identifier, a stored first diagnostic identifier, and a stored second diagnostic identifier, where the stored vehicle identifier represents a particular vehicle having at least first and second vehicle components, where the stored first diagnostic identifier is associated with the first vehicle component, where the stored second diagnostic identifier is associated with the second vehicle component, and where the particular circuit element identifier represents a circuit element that is connected to or is a part of the first vehicle component and that is connected to or is a part of the second vehicle component. The method also involves, in response to receiving the request, determining, by the at least one processor, a circuit element identifier to include in a reply to the request, where determining the circuit element identifier to include comprises: (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier. The method additionally involves generating, by the at least one processor, the reply to the request, where generating the reply comprises generating the reply to include the determined circuit element identifier. The method further involves outputting, by the at least one processor, the generated reply to the request.

In yet another aspect, another computing system is disclosed. The computing system includes a computer-readable medium having stored thereon a particular circuit element identifier that is mapped to a stored vehicle identifier, a stored first diagnostic identifier, and a stored second diagnostic identifier, where the stored vehicle identifier represents a particular vehicle having at least first and second vehicle components, where the stored first diagnostic identifier is associated with the first vehicle component, where the stored second diagnostic identifier is associated with the second vehicle component, and where the particular circuit element identifier represents a circuit element that is connected to or is a part of the first vehicle component and that is connected to or is a part of the second vehicle component. The computing system also includes at least one processor configured to search the computer-readable memory. The computing system additionally include program instructions stored on the computer-readable memory and executable by the at least one processor to receive a request comprising a vehicle identifier, a first diagnostic identifier, and a second diagnostic identifier. The program instructions are also executable to, in response to receiving the request, determine a circuit element identifier to include in a reply to the request by (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier. The program instructions are additionally executable to generate the reply to include the determined circuit element identifier. The program instructions are further executable to output the generated reply to the request.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows an original repair order in accordance with one or more example embodiments.

FIG. 5 shows a presentable repair order in accordance with one or more example embodiments.

FIG. 6 is a flowchart depicting a set of functions that can be carried out in accordance with one or more example embodiments.

FIG. 8 illustrates circuit-element mapping data in accordance with one or more example embodiments.

FIG. 10 illustrates a determination of a circuit element identifier to include in a reply to a request in accordance with one or more example embodiments.

FIG. 12 is a flowchart depicting another set of functions that can be carried out in accordance with one or more example embodiments.

DETAILED DESCRIPTION

I. Introduction

Figure 1:
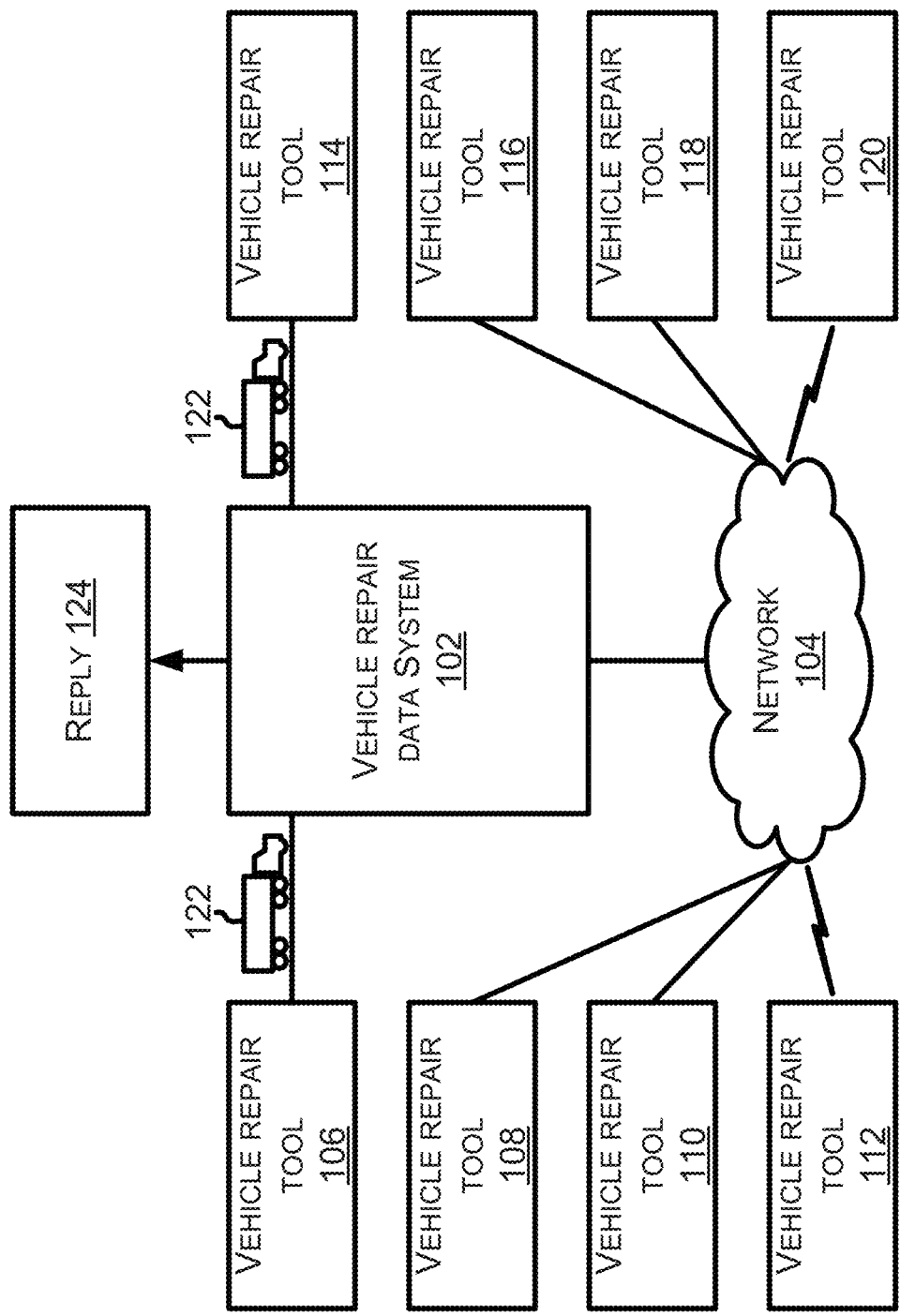
FIG. 1 is a block diagram of a system in accordance with one or more example embodiments.

This description describes several example embodiments including example embodiments regarding analyzing vehicles based on common circuits. At least some of the example embodiments include, but are not limited to include, one or more of the following features: (a) receiving, by at least one processor configured to search a computer-readable memory, a request comprising a vehicle identifier, a first symptom identifier, and a second symptom identifier, where the computer-readable memory has stored thereon a particular circuit element identifier that is mapped to a stored vehicle identifier, a stored first symptom identifier, and a stored second symptom identifier, where the stored vehicle identifier represents a particular vehicle having at least first and second vehicle components, where the stored first symptom identifier represents a first symptom that the first vehicle component can cause the particular vehicle to exhibit, where the stored second symptom identifier represents a second symptom that the second vehicle component can cause the particular vehicle to exhibit, and where the particular circuit element identifier represents a circuit element that is connected to or is a part of the first vehicle component and that is connected to or is a part of the second vehicle component; (b) in response to receiving the request, determining, by the at least one processor, a circuit element identifier to include in a reply to the request, where determining the circuit element identifier to include comprises: (i) making a determination that the received vehicle identifier matches or is mapped to the stored vehicle identifier, that the received first symptom identifier matches or is mapped to the stored first symptom identifier, and that the received second symptom identifier matches or is mapped to the stored second symptom identifier, and (ii) in response to making the determination, determining that the particular circuit element identifier is the circuit element identifier to include based on the particular circuit element identifier being mapped to the stored vehicle identifier, the stored first symptom identifier, and the stored second symptom identifier; (c) generating, by the at least one processor, the reply to the request, where generating the reply comprises generating the reply to include the determined circuit element identifier; and (d) outputting, by the at least one processor, the generated reply to the request.

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

A vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

A vehicle can comprise one or more vehicle systems. Vehicle systems can be defined in a variety of ways and using a variety of terms. In one respect, a vehicle system can operate independently of other vehicle systems to achieve an intended purpose. In another respect, two or more vehicle systems can operate cooperatively to achieve an intended purpose. A vehicle system comprises multiple separately replaceable vehicle components. Two or more defined vehicle systems can comprise the same vehicle component. For example, a power train system and a drive train system of a vehicle known as an automobile can both be defined to include the automatic transmission of the vehicle. Other examples of vehicle systems contained in some automobiles include a braking system, an engine cooling system, an emissions system, an entertainment system, an exhaust system, a restraint system, and a supplemental restraint system. Moreover, a vehicle can exhibit a symptom, which may define an observable or otherwise recognizable problem with the vehicle, such as "check engine light on" or "oil leaking."

A vehicle component (could also be referred to herein as a "component", "part", or "vehicle part") may be a constituent element of a vehicle. Generally, vehicle components can be classified in a variety of ways and using a variety of terms. Examples classifications of vehicle component include electrical, hydraulic, mechanical, optical, wireless, chemical, electro-mechanical, or fluids. Other example classifications of vehicle components exist as well. Some vehicle components connect or keep connected two or more other vehicle components. Examples of the vehicle components that provide for connecting two or more other vehicle components include fasteners (e.g., screws, bolts, nuts, or panel fasteners), hoses, fuses, circuit breakers, optical circuits, and electrical circuits.

An example of a vehicle component may be a circuit element. In practice, a circuit element may be a physical entity that is used to affect physical phenomena in an electrical and/or optical system. For example, a circuit element may contain, transmit, and/or receive physical phenomena, such power, energy, electrons, electric fields, and/or magnetic fields, among other possibilities. Given this, a plurality of circuit elements could form a circuit, which is a path in which electrons, light, and/or other physical phenomena can flow and/or be stored. For example, circuit elements can have terminal or leads that can connect to create an electronic or electrical circuit with a particular function (e.g., oscillator). Other examples are also possible.

In practice, a vehicle and/or a feature of a vehicle can be respectively represented by an identifier, which could be unique a sequence of characters, letters, numbers, and/or symbols that uniquely refer to a particular vehicle or to a particular feature. Given this, a processor and/or an individual can identify a vehicle or a feature of a vehicle based on its respective identifier.

More specifically, a vehicle identifier may represent a particular vehicle or a particular class of vehicle. Thus, a vehicle identifier could be defined with respect to or in association with one or more vehicle attributes, which are described in further detail herein. Also, a vehicle component identifier may represent a particular vehicle component. In some cases, a vehicle component identifier may represent a particular set of vehicle component that collectively form a system or a sub-system of a vehicle, in which case the vehicle component identifier could also be referred to as a vehicle system identifier or a vehicle sub-system identifier. Additionally, a symptom identifier may represent a symptom that a vehicle is exhibiting or otherwise could exhibit. For instance, as further discussed herein, a symptom identifier may be a diagnostic trouble code (DTC). Moreover, a circuit element identifier may represent a particular circuit element in a vehicle. And given that a circuit element is an example/ type of a vehicle component, a circuit element identifier could be considered as an example/type of a vehicle component identifier.

Furthermore, a repair order (RO) comprises an archive of information pertaining to at least one vehicle job (or more simply "job"). Each job can be identified on a separate job line of the RO. An RO can indicate a job status such as prospective, in process, on hold (after being in process), completed, or come-back. The come-back status can represent a job that was considered to be complete until the vehicle was brought back to the repair shop because the job was not performed to the satisfaction of some person, such as a vehicle owner, or for some other reason. More specifically, the come-back status may be defined as a return of a vehicle within a fixed time window (e.g., one month or three months) with the same or a similar problem as initially serviced. A job line can comprise one or more rows of text. A job line can comprise graphical images such as an outline of a vehicle. The graphical image can be marked to indicate information about a job.

A job identified by an RO can comprise explicit job information that indicates a particular procedure that is to be performed, is being performed, or was performed to a vehicle, such as rotate vehicle tires, change engine oil, or replace air filter. A job identified by an RO can comprise implicit job information such as a complaint or symptom that pertains to a vehicle, such as "car does not start," "check engine light on," or "oil leaking." A job with implicit job information can be revised to include explicit job information that identifies a particular procedure performed for the job.

A job identified by an RO can comprise text representing actual language used by a person requesting performance of the job. Additionally or alternatively, a job identified by an RO can comprise text based on an interpretation of the language used by the person requesting performance of the job. A person, such as a service advisor, or a computing device can perform the interpretation.

A job identified by an RO can comprise a job performed by or on behalf of a vehicle repair shop that generates the RO. For example, the job can be performed by a technician that is employed by the vehicle repair shop. As another example, the job can be performed by a third party (e.g., a vehicle glass specialist) commissioned by the vehicle repair shop to perform the job identified by an RO.

An RO can comprise other data within or outside of a job line. The other RO data can comprise, for example, data classifiable in at least one of the following categories of data: repair shop identification data, vehicle owner identification data, service advisor identification data, vehicle technician identification data, vehicle identification data, repair parts data, specification data, labor data, estimate data, financial data, technician notes regarding a job performed by the technician, or miscellaneous RO data.

The repair shop identification data can comprise, for example, data indicating a name, a location, a telephone number, a physical address, an e-mail address, or a website URL of a repair shop where performance of the job occurred. The identification data of a person, such as the vehicle owner, service advisor, or technician, can comprise at least a part of the person's name, a numeric identifier, or an alpha-numeric identifier. The vehicle owner identification data can comprise a telephone number, a physical address, or an e-mail address of the vehicle owner. The service advisor or technician identification data can comprise an employee number assigned by the vehicle repair shop.

The vehicle identification data can comprise a vehicle identification number of a particular vehicle or data indicating some other characteristics of the particular vehicle, such as the year, make, and model of the particular vehicle or a number on a license plate attached to the vehicle. The repair parts data can comprise data that indicates, for example, a brand, quantity, amount, or price of a repair part or supply, such as a fluid, used to carry out the job. The specification data can comprise data that indicates, for example, capacities of a particular vehicle or torque specifications for the particular vehicle. The labor data can comprise data that indicates, for example, a labor rate or flagged hours. The labor rate can be associated with the vehicle repair shop or the technician assigned to the job. Flagged hours can indicate actual times when the job was performed, such as 8:15 AM to 8:45 AM.

The estimate data can comprise cost and time estimates for carrying out each job on the RO. The estimate data can comprise one or more estimates, such as an original estimate and a revised estimate. The financial data can comprise, for example, a financial summary of costs associated with the job(s) indicated on the RO, labor rate information, or tax information. The miscellaneous RO data can comprise, for example, a calendar date, an RO number, or a vehicle odometer reading.

An RO can be archived on a variety of media, such as any of a variety of different types of paper, or within a variety of media, such as any of a variety of different non-transitory computer-readable memories. An RO stored in a computer-readable memory can comprise metadata that identifies the category of one or more data elements on RO.

The data to be archived as part of an RO can be received in various ways. For example, a service advisor can receive information to archive as part of an RO during a conversation in person or over the telephone, by an inspection, such as a visual inspection, or in writing. The service advisor can archive the received information by, for example, recording the information on a paper RO or entering the information into a computing device via a computer input device, such as a keyboard or mouse. The computing device can store the received information within a memory device as part of an RO.

The information of an RO can comprise information a computing device receives via a vehicle data message generated by the vehicle. The information within a vehicle data message can, for example, comprise a vehicle identification number, an odometer reading, a diagnostic trouble code, a vehicle measurement performed by a component on a vehicle, or a parameter identifier (PID) and PID value. The vehicle measurement can, for example, comprise a tire pressure measurement or a tire temperature measurement.

The information of an RO can comprise information a computing device receives via a message generated by a service tool used to perform the job. As an example, the service tool can comprise a wheel alignment machine that generates a message with pre-alignment wheel measurements and post-alignment wheel measurements. As another example, the service tool can comprise a vehicle inspection machine that generates measurements during an inspection of the vehicle as the vehicles passes onto or in proximity of the vehicle inspection machine.

The information of an RO can comprise information a computing device receives via a phone call. For example, the computing device can receive audio or user selections via a touch-tone selection system during a phone call, convert the received audio and/or user selections into information to be recorded as part of an RO, and store the information in the memory. The audio or user selections can represent any data described herein as being part of an RO.

The information of an RO can comprise information a computing device receives from a remote computing device running an application for inputting RO information. The remote computing device can comprise a smartphone, tablet device, a desktop or laptop computer or some other computing device. The information received from the remote computing device can comprise any data described herein as being part of an RO.

The information of an RO can comprise data indicating performance of a job identified on the RO is declined or approved. The data indicating declining or approving performance of a job can comprise an electronic signature of a person that declined or approved performance of the job.

An RO can be revised. For example, an RO may initially identify a complaint, but not a cause of the complaint or a correction to the vehicle made during performance of a job. After performance of the job, the RO may be revised to indicate the cause and the complaint. As another example, an RO generated with an implicit job "oil leaking" can be revised to reflect what job was carried out on a vehicle. For instance, the RO can be revised to state "oil leaking, looked for engine for oil leaks, replaced main seal." Moreover, the RO can be revised based on at least one of a taxonomy or an ontology so that the RO recites predefined terms and phrases for jobs, vehicle components, vehicle component locations or other information. For example, the initial RO can be revised to state, "Customer states vehicle is leaking oil. Technician inspected vehicle for oil leaks. Technician removed and replaced rear main bearing engine oil seal. Technician confirmed vehicle is not leaking oil."

An RO can include an initial number of job lines. The RO can be revised to include a different number of job lines. The different number of job lines can be based on a vehicle technician recommending performance of some additional job not listed among the initial number of job lines. The additional job can be identified on a job line added by revising the RO.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT can include or be arranged as a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
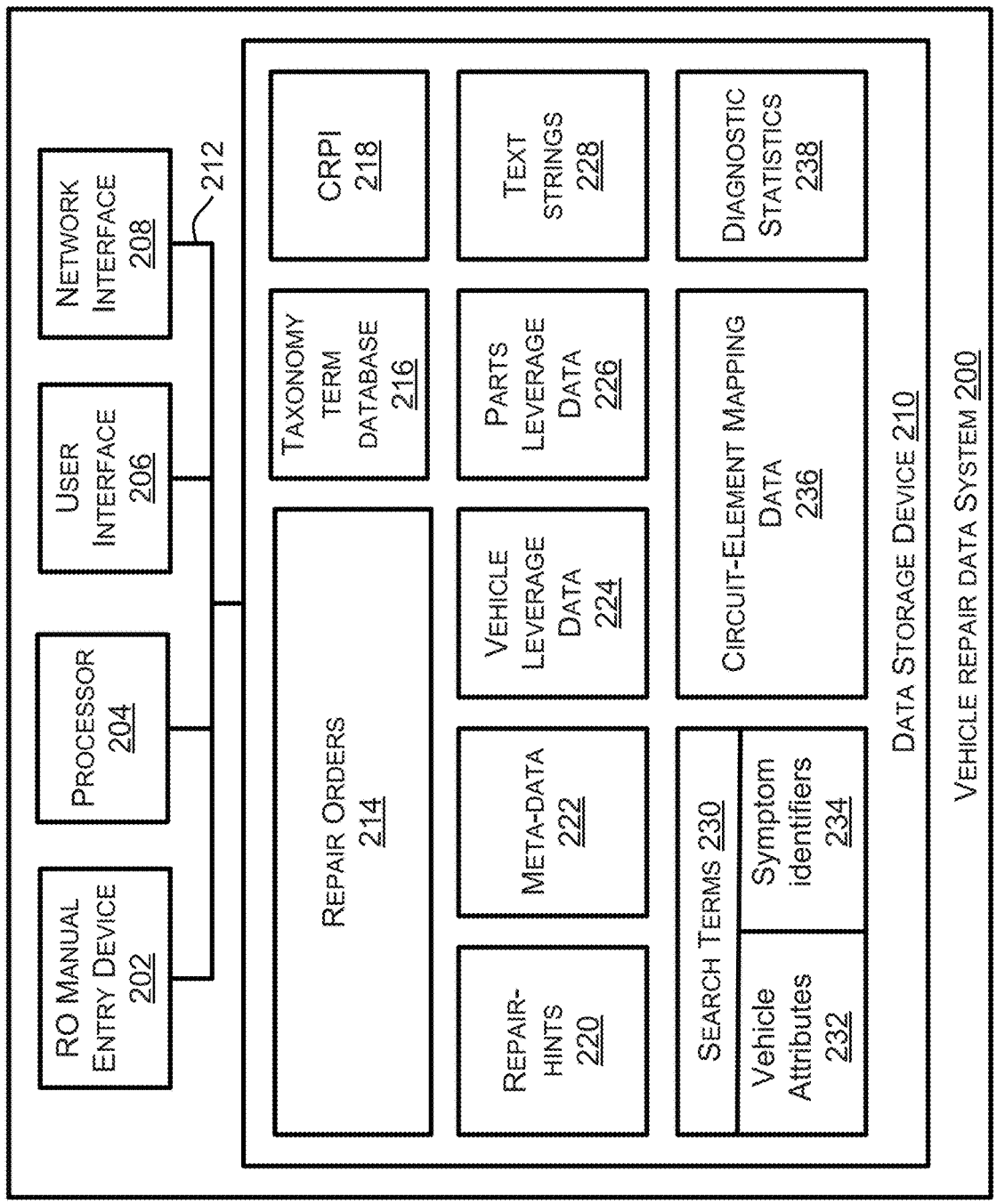
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 can include or be arranged as a machine. VRD system 200 or one or more components thereof can be arranged or referred to as a computing system or a computer system. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times. Processor 204 can be programmed to perform any one or any combination of functions performed by execution of a program instruction of CRPI 218.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as such as data storage device 210 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle attributes 232, such as a vehicle year/make/model/engine (Y/M/M/E) attribute, and symptom identifiers 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates vehicle attributes of the given vehicle, vehicle service requests 410, 412, and 414 indicating the complaint(s) or service(s) requested by the customer, parts information 416 indicating vehicle components obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 word, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 500 (shown in FIG. 5) that represents original RO 400 or data thereon. Additionally or alternatively, presentable RO 500 can be distinct and separate from original RO 400.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214 or after an RO is transferred from one cluster to a different cluster. Table 1 shows examples of DTC, Action, and vehicle component attributes associated with each respective RO cluster.

TABLE 1

| Cluster ID | Cluster Size | DTC | Action | Vehicle Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine vehicle attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6, VIN (2) |
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E vehicle attributes can lead to search results having RO or repair-hints associated with a particular sub-model, but not the other sub-model(s) of a particular vehicle having particular Y/M/M/E vehicle attributes. The "S" within Y/M/M/S/E vehicle attributes can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of vehicle attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Component Identifier | Common Vehicle Component | Vehicle Models | Model Year(s) | Vehicle component(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle component and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle attributes, and parts usage information from the original RO for use in generating a presentable RO or to increment a count of a cluster size if a presentable RO pertaining to the original RO has already been generated, or to decrement a cluster size if processor 204 transfers an RO from one cluster to a different cluster.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

CRPI 218 can include program instructions executable by processor 204 to perform any one or more of the operations, functions, or actions illustrated in blocks 602-608 in FIG. 6 and/or in blocks 1202-1208 in FIG. 12 as described below in this description.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle attributes 232 or symptom identifiers 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E vehicle attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 510 on RO ID 3915 can be identified in response to receiving NSST-227, determining that SST-15 is associated with NSST-227, and determining RO ID 3915 is associated with SST-15. SST-1456 is a set of standard search terms having symptom identifiers criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Vehicle Attributes | Symptom Identifiers | Associations |
|---|---|---|---|
| NSST-227 | 97 Ford Crown Vic. 8 cyl. | Emissions and MAF failed. DTC P171 P174. | SST-15 |
| SST-15 | 1999/Ford/Crown Victoria/4.6 L V8 (W) | Pcode: P0171, P0174 Component: MAF sensor Work Requested: failed state emissions certification | RO ID 3915 NSST-227 |
| SST-1456 | 2000/Ford/Crown | Pcode: P0171, P0174 | RO ID 3915 |

TABLE 5-continued

| Search Terms | Vehicle Attributes | Symptom Identifiers | Associations |
|---|---|---|---|
| | Victoria/4.6 L V8 (W) | Component: MAF sensor Work Requested: failed state emissions certification | |

The vehicle attributes 232 is one example of search terms that can be included within search terms 230. Vehicle attributes 232 can include various selectable attributes. For example, the attributes of vehicle attributes 232 can include Y/M/M/E attributes. As another example, the attributes of vehicle attributes 232 can include Year/Make/Model/Sub-model/Engine (Y/M/M/S/E) attributes as discussed with respect to Table 2. As another example, the attributes of vehicle attributes 232 can include Year/Make/Model/Engine/System (Y/M/M/E/Sys) attributes. As another example, the attributes of vehicle attributes 232 can include Year/Make/Model/Sub-model/Engine/System (Y/M/M/S/E/Sys) attributes.

The system (Sys) attribute of a vehicle attribute 232 can indicate or represent a vehicle system (e.g., one or more vehicle systems) or a vehicle component (e.g., one or more vehicle components) within a vehicle. As an example, the vehicle system or vehicle component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other vehicle system or vehicle component installed within, attached to, or other otherwise operating on or in the vehicle.

The order of any of the vehicle attributes 232 described herein can be rearranged as desired. For example, the order of the Y/M/M/E vehicle attributes could be rearranged as Make/Model/Engine/Year (M/M/E/Y) vehicle attributes or in another arrangement.

FIG. 5 shows an example content of a presentable RO 500 including an RO identifier 502, RO timing information 504, RO vehicle attribute 506, a vehicle service request 508, an auto-generated repair-hint 510, meta-data 512, and a usage indicator 514. Presentable RO 500 is based on service procedure information 418 an original RO 400. RO identifier 502 is "3915," which is also shown in the seventeenth row of Table 2. RO timing information 504 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle attribute 506 includes the year/make/model/engine vehicle attributes shown in the seventeenth row of Table 2 for RO ID 3915. Additional or other vehicle attributes of the given vehicle identified on original RO 400 can be included on presentable RO 500.

Presentable RO 500 includes elements in or based on original RO 400. Presentable RO 500 can be stored within data storage device 210 with or as part of original RO 400. Additionally or alternatively, presentable RO 500 can be stored separately and distinctly from original RO 400.

Vehicle service request 508 includes information pertaining to a vehicle service request on an RO within RO 214.

Vehicle service request 508 can include one or more text strings from text strings 228. As an example, each sentence within vehicle service request 508 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 512.

Auto-generated repair-hint 510 can include one or more text strings from text strings 228. As an example, each sentence within auto-generated repair-hint 510 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 512 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 510, such as all of the sentences, but the first sentence, within auto-generated repair-hint 510. Processor 204 can select fuel pump pressure readings (e.g., 30 and 40) to insert within the second sentence of that text string, and to select a component name (e.g., MAF sensor) from meta-data 512 or taxonomy term database 216 to insert in the $4^{th}$ through $9^{th}$ sentences of the multiple-sentence text string. Those inserted terms are underlined within FIG. 5.

Meta-data 512 can be stored with presentable RO 500 within RO 214. Additionally or alternatively, meta-data 512 can be stored within meta-data 222 along with a tag or reference to presentable RO 500.

Usage indicator 514 indicates a distance in miles associated with RO 500. Usage indicator 514 can be used by processor 204 to determine whether to select auto-generated repair-hint 510 when searching for a repair-hint based on a set of search terms.

Figure 3:
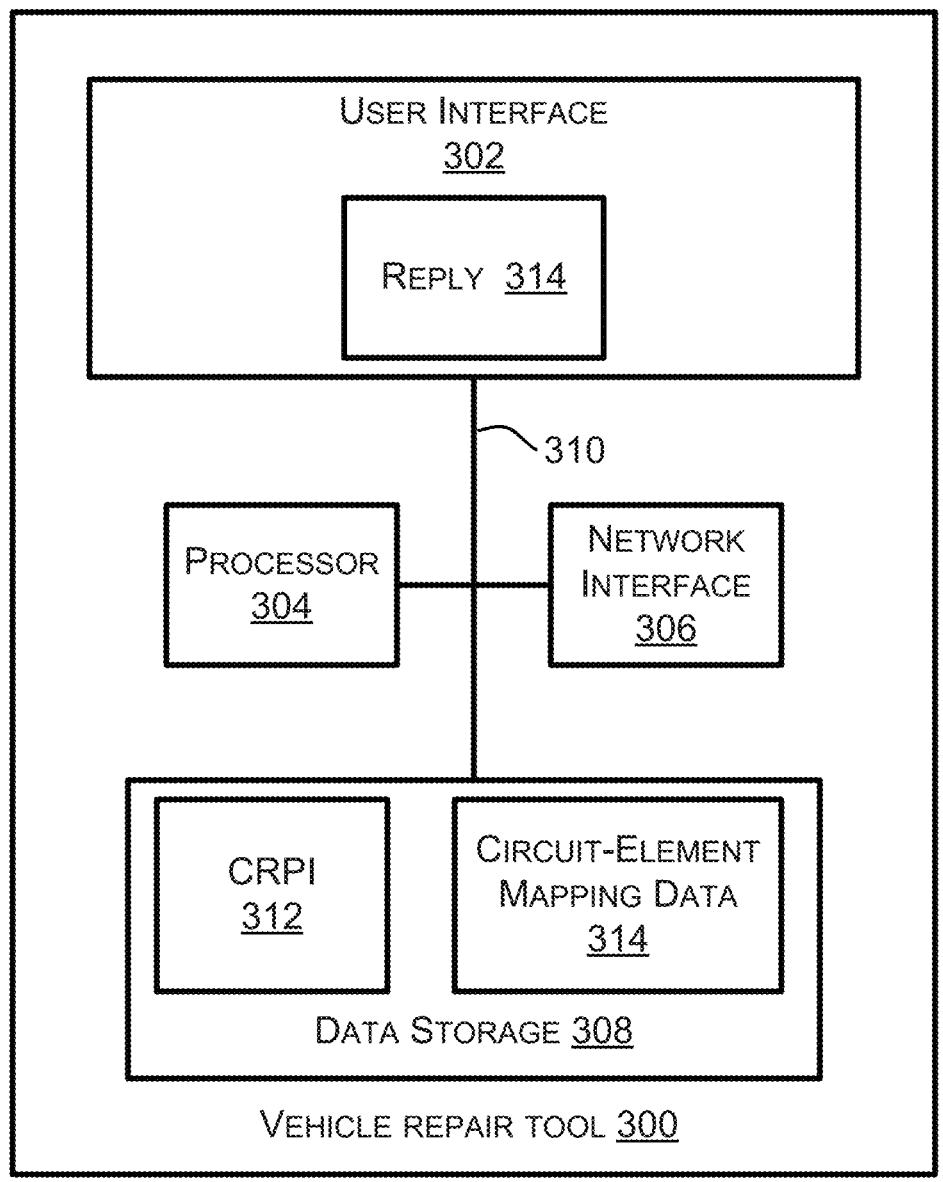
FIG. 3 is a block diagram showing a vehicle repair tool in accordance with one or more example embodiments.

Next, FIG. 3 is a block diagram showing details of example a vehicle repair tool (VRT) 300. VRT 300 can include or be arranged as a machine. Thus, VRT 300 or one or more components thereof can be arranged or referred to as a computing system or a computer system. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wis. Accordingly, a VRT can also include computer-readable program instructions to perform features such as, but not limited to, guided component tests, an online expert forum, electrical measurements, waveform capture, displaying vehicle records, etc.

III. First Example Operations

Example implementations disclosed herein relate to analyzing vehicles based on common circuit elements, such as a circuit element that is connected to or is a part of a first vehicle component and that is connected to or is a part of a second vehicle component.

In particular, a vehicle and/or or its component(s) could exhibit multiple symptoms at substantially the same time. And in some cases, these multiple symptoms could all be exhibited due to the same root cause, such as due to a problem related to a particular circuit element in the vehicle. Accordingly, the disclosed implementation may help identify a circuit element that could be causing the vehicle and/or or its component(s) to exhibit these multiple symptoms. In this way, a repair technician could then work to repair a problem associated with the circuit element, so as to resolve the multiple symptoms being exhibited.

FIG. 6 is a flowchart illustrating a method 600, according to an example implementation. Method 600 shown in FIG. 6 (and other processes and methods disclosed herein) presents a method that can be implemented within an arrangement involving, for example, system 100, VRD system 200, and/or VRT 300 (or more particularly by one or more components or subsystems thereof, such as by a processor and a (e.g., non-transitory or transitory) computer-readable medium having instructions that are executable to cause the device to perform functions described herein). Additionally or alternatively, method 600 may be implemented within some other arrangement and system.

Method 600 and other processes and methods disclosed herein may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves receiving, by at least one processor (e.g., processor 204 and/or processor 304) configured to search a computer-readable memory (e.g., data storage device 210 and/or data storage 308), a request comprising a vehicle identifier, a first symptom identifier, and a second symptom identifier, where the computer-readable memory has stored thereon a particular circuit element identifier that is mapped to a stored vehicle identifier, a stored first symptom identifier, and a stored second symptom identifier, where the stored vehicle identifier represents a particular vehicle having at least first and second vehicle components, where the stored first symptom identifier represents a first symptom that the first vehicle component can cause the particular vehicle to exhibit, where the stored second symptom identifier represents a second symptom that the second vehicle component can cause the particular vehicle to exhibit, and where the particular circuit element identifier represents a circuit element that is connected to or is a part of the first vehicle component and that is connected to or is a part of the second vehicle component.

As an initial matter, a particular vehicle may be distinguished from other vehicles based on one or more vehicle attributes. These vehicle attributes may include, but are not limited to: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, and (x) a vehicle fuel system type. Other vehicle attributes are also possible.

Further, a given symptom could be associated in various ways with a given component, as the given vehicle component of the particular vehicle could itself exhibit the given symptom and/or could cause another component or system of the particular vehicle to exhibit the given symptom. By way of example, a vehicle owner, a repair technician, and/or a VRT could determine a symptom identifier indicating that the particular vehicle is exhibiting the given symptom caused by the given vehicle component (e.g., "engine runs rough"). This symptom identifier could represent a DTC, such as one determined by a VRT diagnosing the vehicle and/or one that a repair technical has identified. Alternatively, the symptom identifier may not represent a DTC and could, for instance, take the form of text or speech data identifying the symptom, such as data generated based on text/speech provided by a repair technician and/or a customer following an observation of the particular vehicle, for instance.

Nonetheless, the particular vehicle may have at least first and second vehicle components that could respectively cause the particular vehicle to exhibit multiple symptoms. In particular, the first vehicle component could cause the particular vehicle to exhibit a first symptom and the second vehicle component could cause the particular vehicle to exhibit a second symptom. Generally, the first and second vehicle components may be different vehicle components. But in some cases, the first and second vehicle components at issue could be the same vehicle component, which would amount to a single vehicle component that causes the particular vehicle to exhibit the first and second symptoms. Additionally, the first and second symptoms may generally be different symptoms. But in some cases, the first and second symptoms at issue could be the same symptom, which would amount to a two vehicle components each exhibiting or otherwise causing the vehicle to exhibit the same symptom.

Furthermore, the first vehicle component could cause the particular vehicle to exhibit the first symptom while the second vehicle component causes the particular vehicle to exhibit the second symptom. More specifically, the particular vehicle could exhibit the first and second symptoms at substantially the same time, such as during a time frame in which the particular vehicle is being observed, diagnosed, and/or repaired, among other options. For example, during diagnosis or observation of the particular vehicle, a VRT (and/or a repair technician) could determine first and second symptom identifiers representative of symptoms that the particular vehicle is exhibiting at the time of diagnosis/observation. Other examples are also possible.

Yet further, a vehicle could have one or more circuit elements, such as circuit element(s) that are part of vehicle component(s) and/or circuit element(s) that are connected to vehicle component(s), among others. Generally, a circuit element may be any part or combination of parts in a circuit, such an electrical and/or an optical circuit that is found in a vehicle. By way of example, a circuit element could be a power source, an electrical ground, an electrical connector, a transistor, a capacitor, an inductor, a resistor, an integrated circuit, an electrical switch, an electrical fuse, an electrical relay, a semiconductor, a vacuum tube, a resonator, a transducer, a connector terminal, a conductor, a circuit breaker, a solenoid, a transmitter, a receiver, a transceiver, a splice ring, an electrical shield, a circuit board, a circuit board trace, an optical cable, an optical cable connector, an optical shield, and/or an optical switch. Other examples are also possible.

In this regard, a circuit element could be part of a vehicle component and/or could be connected to a vehicle component. More specifically, a circuit element being a part of a vehicle component could amount to the circuit element being part of a circuit integrated in the vehicle component, such as during manufacturing of the vehicle component, for instance. Whereas, a circuit element being connected to a vehicle component could amount to the circuit element being part of another vehicle component/system while having a connection with the vehicle component at issue, such as a connection established during assembly of the vehicle, for instance. Generally, the connection at issue could be a wired connection or a wireless connection. For instance, the connection may be an interface that includes a wired interface operable for engaging in wired transfer of data/signals/power and/or may include a wireless interface operable for engaging in wireless transfer of data/signals/power.

In some situations, a single circuit element could be associated with both the first and second vehicle components at issue. For example, the circuit element could be part of the first vehicle component and could be connected to the second vehicle component, or vice versa. In another example, the circuit element could be connected to both the first and second vehicle components. Other examples are also possible.

In such situations, the circuit element associated with both the first and second vehicle components could be the actual root cause of the first and second symptoms exhibited due to problem(s) with the first and second vehicle components. In particular, the circuit element could experience a problem, such as by being defected, broken and/or missing, among other possibilities. Due to the problem with the circuit element, the first and second vehicle component could each respectively encounter a problem. For instance, if the circuit element is part of a given one of the vehicle components, that vehicle component may not be able to perform certain operation(s) due to the problem with the circuit element. And if a given one of the vehicle components is connected to the circuit element, that vehicle component may not receive certain data/signals/power from the circuit element and, as a result, may not be able to perform certain operation (s). Nonetheless, when the first vehicle component encounters a problem due to the problem with the circuit element, the first vehicle component could cause the particular vehicle to exhibit the first symptom. Similarity, when the second vehicle component encounters a problem due to the problem with the circuit element, the second vehicle component could cause the particular vehicle to exhibit the second symptom.

Figure 7:
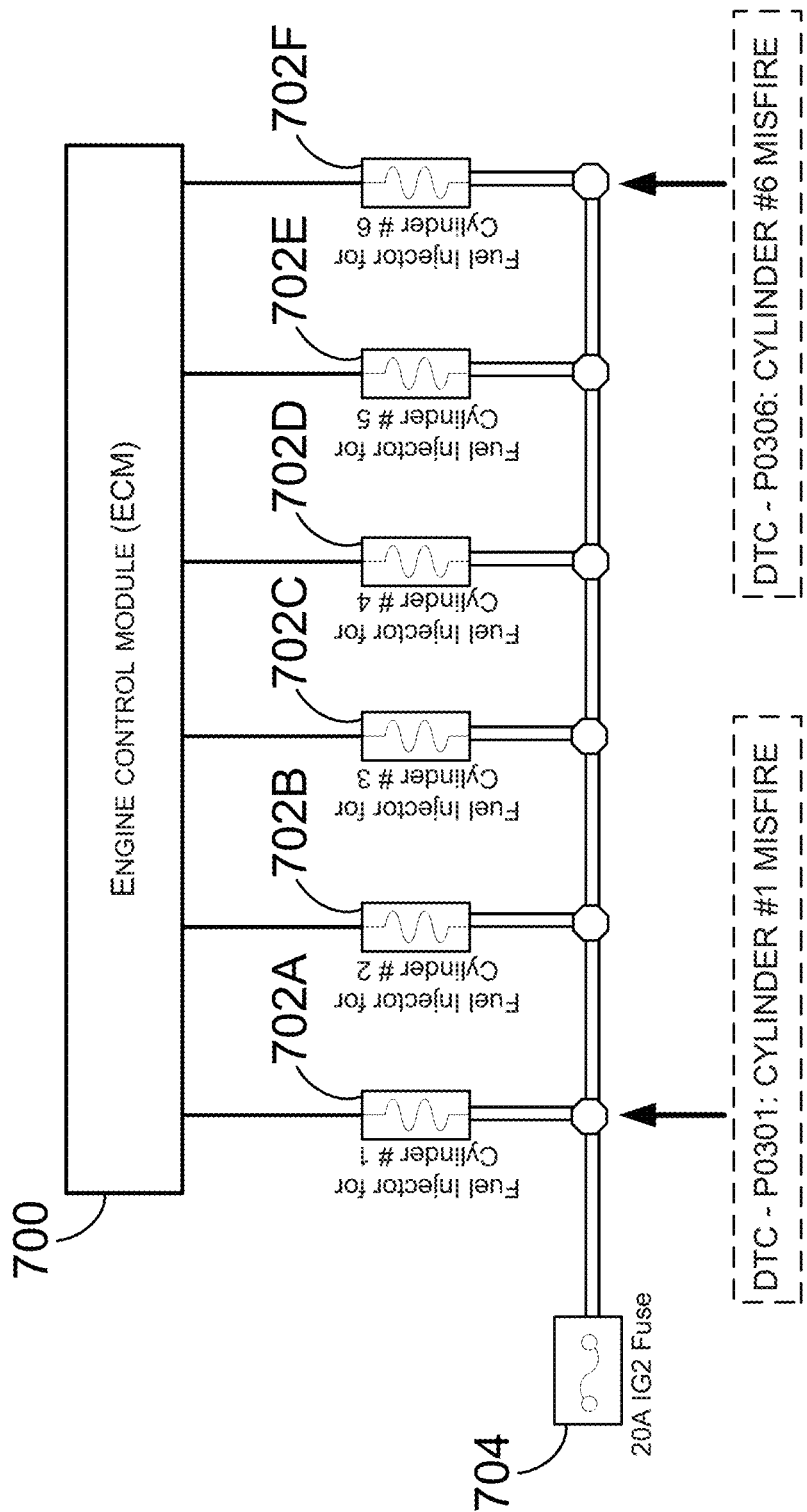
FIG. 7 illustrates a relationship between a circuit element and multiple symptoms exhibited by a vehicle in accordance with one or more example embodiments.

By way of example, FIG. 7 illustrates how a circuit element could be a root cause of multiple symptoms. As shown, a particular vehicle (e.g., a 6-cylinder 2010 Toyota Camry) could have an engine control module (ECM) 700 that controls functionality of fuel injectors 702A-702F. The fuel injectors 702A-702F respectively correspond to cylinders of the particular vehicle, which are labeled as cylinders #1 to #6. Additionally, all fuel injectors are shown as connected to a 20A IG2 Fuse 704 that may provide over-current protection related to power supplied to the fuel injectors 702-702F. With this arrangement, diagnosis of the particular vehicle could give rise to DTC-P0301, which indicates a misfire related to cylinder #1, and simultaneously to DTC-P0306, which indicates a misfire related to cylinder #6. As such, given that fuel injector 702A corresponds to cylinder #1 and is connected to the 20A IG2 Fuse 704 and given that fuel injector 702F corresponds to cylinder #6 and is also connected to the 20A IG2 Fuse 704, a problem with the 20A IG2 Fuse 704 may be the root cause of the DTC-0301 and the DTC-0306. Other illustrations are possible as well.

Given this, according to the present disclosure, the computer-readable memory could be arranged to have stored thereon circuit-element mapping data that represents at least one relationship between multiple symptoms that a vehicle could exhibit at substantially the same time and a circuit element in the vehicle that could be a root cause of those symptoms. For example, FIG. 2 illustrates that the data storage device 210 could have stored thereon circuit-element mapping data 236. In another example, FIG. 3 illustrates that the data storage 308 could have stored thereon circuit-element mapping data 314.

Generally, the circuit-element mapping data could represent such relationship(s) respectively for one or more vehicles each having a particular vehicle attribute and/or could represent such relationship(s) respectively for one or more vehicle classes each including vehicles that share at least one vehicle attribute (e.g., a vehicle class may be a group of vehicles built on a common platform as defined by vehicle leverage data 224). Moreover, for each vehicle and/or vehicle class, the circuit-element mapping data could respectively represent one or more such relationships. In either case, the circuit-element mapping data could be established via manual engineering input, among other possibilities.

In order to represent a given relationship, the circuit-element mapping data could map a circuit element identifier to a stored vehicle identifier, a stored first symptom identifier, and stored second symptom identifier. The stored vehicle identifier could represent a particular vehicle having first and second vehicle components or could represent a particular vehicle class including vehicles that each have the first and second vehicle components. Additionally, the stored first symptom identifier could represent a first symptom that the first vehicle component could cause the particular vehicle or vehicles of the particular vehicle class to exhibit. Similarly, the stored second symptom identifier could represent a second symptom that the second vehicle component could cause the particular vehicle or vehicles of the particular vehicle class to exhibit. Further, the circuit element identifier may be an identifier of a circuit element that is connected to or is a part of the first vehicle component and that is connected to or is a part of the second vehicle component, and thus of a circuit element that could encounter a problem that ultimately gives rise to the first and second symptoms in line with the discussion above.

By way of example, the stored vehicle identifier could be a Y/M/M/E, the stored first symptom identifier may be a first DTC or may be another first identifier of the first symptom, and the stored second symptom identifier may be a second DTC or may be another second identifier of the second symptom. In practice, the other first/second identifier could be text representative of a symptom, such as "MAF sensor failed" for instance, among other options.

Moreover, the circuit element identifier could take one of various forms. For instance, a circuit element identifier could be a numeric circuit element identifier that takes the form of one or more numbers identifying the circuit element at issue, such as circuit number assigned by or for a manufacturer's service manual schematic. In another example, a circuit element identifier could be an alphabetical circuit element identifier that takes the form of one or more letters and/or symbols identifying the circuit element at issue. In yet another example, a circuit element identifier could be an alpha-numeric circuit element identifier that takes the form of some combination of number, letters, and/or symbols identifying the circuit element at issue. In yet another example, a circuit element identifier could be a schematic diagram circuit element identifier that takes the form of a schematic diagram illustrating at least the circuit element at issue. Other examples and combinations of these examples are also possible.

FIG. 8 next illustrates an example circuit-element mapping data 800 that a computer-readable memory may have stored thereon, in accordance with an example implementation. As shown, the mapping data 800 illustrates a mapping 802 that is in line with the example scenario shown in FIG. 7. In particular, the mapping 802 maps the circuit element identifier "20A IG2 Fuse" with a vehicle identifier "2010 Toyota Camry", a first symptom identifier "DTC-P0301", and a second symptom identifier "DTC-P0306." In this way, the mapping 802 represents that a problem with the 20A IG2 Fuse of a 2010 Toyota Camry could give rise simultaneously to DTCs P0301 and P0306.

Further, mapping data 800 illustrates another mapping 804 that maps a circuit element identifier "E3 Ground Point" to the vehicle identifier "2010 Toyota Camry", a first symptom identifier "Power Seat Adjustment", and a second symptom identifier "Blower Motor Malfunction." In practice, this mapping 804 could be established because a power seat in a 2010 Toyota Camry and a blower motor in the 2010 Toyota Camry may share an electrical ground labeled as "E3". Therefore, if adjustment of the power seat results in a malfunction of the blower motor, the mapping 804 could help indicate that the root cause of this scenario is a problem with the "E3" electrical ground shared by the power seat and the blower motor.

Yet further, mapping data 800 illustrates another mapping 806 that maps a circuit element identifier "10A Dome Fuse" with the vehicle identifier "2010 Toyota Camry", a first symptom identifier "clock malfunction", and a second symptom identifier "Fog Lights Malfunction." In practice, this mapping 806 could be established because fog lights in a 2010 Toyota Camry and a clock in the 2010 Toyota Camry might both be connected to a "10A Dome Fuse" that may provide overcurrent protection related to power supplied to the fog lights and the clock. Therefore, if both the fog lights and the clock stop working following an attempt to turn on the fog lights, then mapping 806 could help indicate that the root cause of this scenario is a problem with the "10A Dome Fuse" connected to both the fog light and the clock. Other examples and illustrations are possible as well.

As noted above, the at least one processor that is configured to search the computer-readable memory may receive a request including a vehicle identifier as well as first and second symptom identifiers. Generally, this request may implicitly or explicitly be a request for information that could help resolve symptoms exhibited by a vehicle. Also, the request may be received as part of a process of generating an RO associated with a particular vehicle. As such, the at least one processor could use the received vehicle identifier as basis to identify the particular vehicle (and/or a class of the particular vehicle) exhibiting first and second symptoms at substantially the same time, could use the first symptom identifier as basis to identify the first symptom, and could use the second symptom identifier as basis to identify the second symptom.

Moreover, when the at least one processor receives the request, the request may initially include some or all of the vehicle identifier, the first vehicle symptom identifier, and the second vehicle symptom identifier. For example, the at least one processor could receive the vehicle identifier, the first vehicle symptom identifier, and the second vehicle symptom identifier in a single request. But in another example, the at least one processor may initially receive the first symptom identifier and the vehicle identifier, and may then determine a set of symptom identifiers associated with the first symptom identifier and the vehicle identifier. For instance, the at least one processor could determine the set based on each identifier in the set being respectively listed along with the first symptom identifier and the vehicle identifier in a mapping found as part of the circuit-element mapping data at issue. Nonetheless, the at least one processor could then output (e.g., on a display device of the VRT) a prompt to select one or more symptom identifiers from the set. Following output of the prompt and assuming that the second symptom identifier is included in the set, the at least one processor could receive input data indicating selection of the second symptom identifier from the set. In this way, the prompt could effectively ask whether or not the vehicle is exhibiting any other symptom that is related to an already identified symptom due both of these symptoms having the potential to be caused by a problem with the same circuit element.

Furthermore, the at least one processor may receive the request in various ways. In one implementation, the at least one processor may receive the request via a VRT. For example, the vehicle identifier, the first symptom identifier, and/or the second symptom identifier could be received as input data provided at the VRT (e.g., provided by a repair technician when generating a repair order for the vehicle). In another example, the at least one processor may receive the request from an electronic control unit (ECU) of a vehicle via a VRT that is removably connected to the ECU (e.g., a VRT connected to the vehicle through a wired or a wireless connection). Generally, an ECU may be an embedded component or system that is configured to control and/or monitor one or more components, systems and/or sub-systems of a vehicle. For instance, an ECU could be an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), or a Suspension Control Module (SCM).

Figure 9:
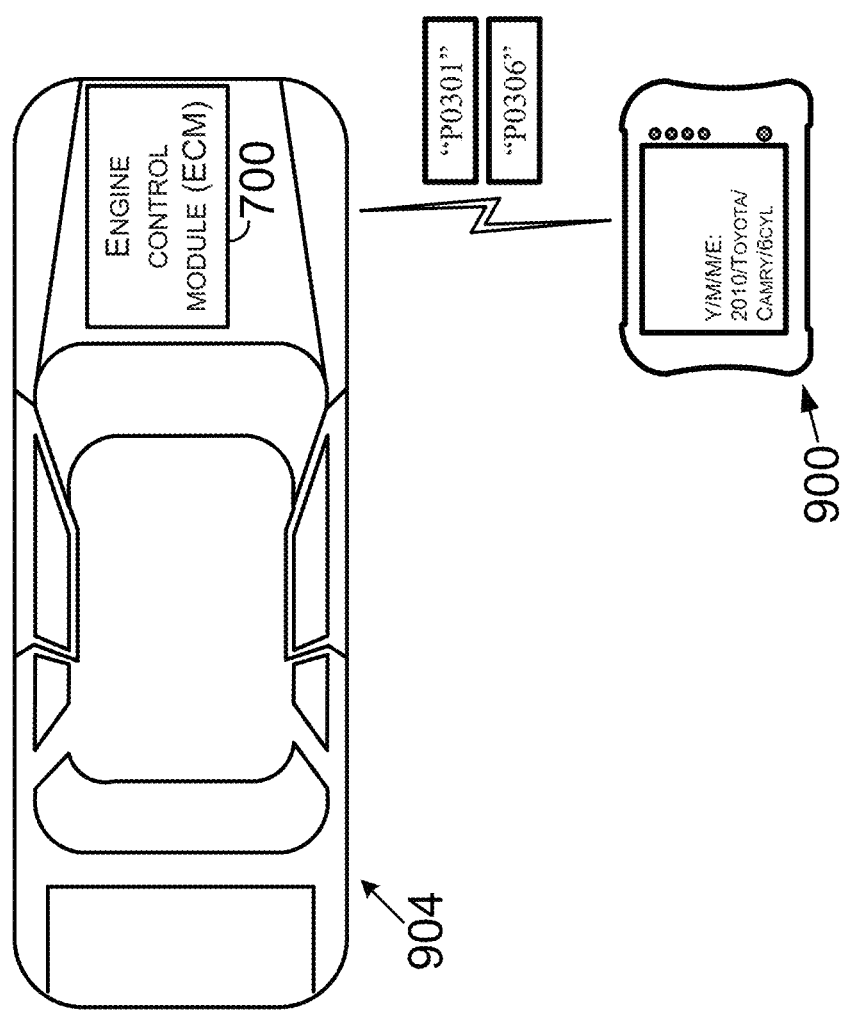
FIG. 9 illustrates communication between a vehicle repair tool and a vehicle in accordance with one or more example embodiments.

FIG. 9 next illustrates scenario in which at least one processor receives a request in line with the discussion above. As shown, a representative VRT 900 receives, over a wireless communication link, information from a representative vehicle 904's Engine Control Module (ECM) 700, the vehicle 904 being the 2010 Toyota Camry that includes the ECM 700 as introduced in FIG. 7. This received information may include an indication of a vehicle identifier "Y/M/ME: 2010/Toyota/Camry/6Cylinder", a first symptom identifier corresponding to DTC-P0301, and a second symptom identifier corresponding to DTC-P0306. Other illustrations are possible as well.

At block 604, method 600 involves, in response to receiving the request, determining, by the at least one processor, a circuit element identifier to include in a reply to the request, where determining the circuit element identifier to include comprises: (i) making a determination that the received vehicle identifier matches or is mapped to the stored vehicle identifier, that the received first symptom identifier matches or is mapped to the stored first symptom identifier, and that the received second symptom identifier matches or is mapped to the stored second symptom identifier, and (ii) in response to making the determination, determining that the particular circuit element identifier is the circuit element identifier to include based on the particular circuit element identifier being mapped to the stored vehicle identifier, the stored first symptom identifier, and the stored second symptom identifier.

Once the at least one processor receives the request, the at least one processor may responsively determine which circuit element identifier to include in a reply to the request, so as to provide information related to a circuit element that could be causing the particular vehicle to exhibit multiple symptoms. To do so, the at least one processor may determine whether the received identifiers respectively match and/or are mapped to stored identifiers that are included in a given one of the mappings in the circuit-element mapping data. If so, then the at least one processor may determine that the circuit element identifier to include is the particular circuit element identifier that is mapped to the stored identifiers in the circuit-element mapping data.

To determine whether or not a given received identifier matches a given stored identifier, the at least one processor may, for example, determine whether or not the sequence of numbers, letter, and/or symbols of the received identifier matches the sequence of numbers, letter, and/or symbols of the stored identifier. If the at least one processor determines that these sequences match one another, then the at least one processor may determine that the received identifier matches the stored identifier. But if the at least one processor determines that these sequences do not match one another, then the at least one processor may determine that the received identifier does not match the stored identifier.

Whereas, to determine whether or not a given received identifier is mapped to a given stored identifier, the at least one processor may, for example, refer to identifier-mapping data stored in the computer-readable memory. In particular, the identifier-mapping data may map each of a plurality of identifiers respectively to one or more other identifiers. Generally, these mappings may be established for various reasons. For instance, the identifier-mapping data could map two different identifiers that are both used to identify the same feature (e.g., the same vehicle or the same symptom). As such, the at least one processor may determine that a received identifier is mapped to a stored identifier if such a mapping exists in the identifier-mapping data.

Accordingly, the at least one processor could make a determination that the received vehicle identifier matches or is mapped to a stored vehicle identifier, that the received first symptom identifier matches or is mapped to a stored first symptom identifier, and that a received second symptom identifier matches or is mapped to the stored second symptom identifier. Then, the at least one processor may responsively determine that a particular circuit element identifier is mapped, as part of the circuit-element mapping data, to the stored vehicle identifier, the stored first symptom identifier, and the stored second symptom identifier. Given this, the at least one processor may responsively determine that the particular circuit element identifier is the circuit element identifier to include in the reply to the request.

FIG. 10 next illustrates that the VRT 900 determines that a circuit element identifier 1000 should be included in a reply to the request. In particular, as discussed above with reference to FIG. 9, the VRT 900 receives information including an indication of a vehicle identifier "Y/M/ME: 2010/Toyota/Camry/6Cylinder", a first symptom identifier corresponding to DTC-P0301, and a second symptom identifier corresponding to DTC-P0306. Given this information, the VRT 900 may make a determination that the received identifiers respectively match and/or are mapped to the stored vehicle identifier and the stored symptom identifiers listed in the mapping 802 of the mapping data 800. In response to making this determination, the VRT 900 may determine that the "20A IG2 Fuse" is the circuit element identifier 1000 to include based on this circuit element identifier being mapped to the stored vehicle identifier and the stored symptom identifiers listed in the mapping 802. Other illustrations are possible as well.

At block 606, method 600 involves generating, by the at least one processor, the reply to the request, where generating the reply comprises generating the reply to include the determined circuit element identifier.

Once the at least one processor has determined the circuit element identifier to include in the reply, the at least one processor may then generate the reply such that the reply includes the determined circuit element identifier. In an example implementation, the at least one processor may do so by generating, copying, and/or moving data that includes information specifying the determined circuit element identifier, and by then including this data in the reply. Moreover, generating the reply could involve generating a new RO to include the determined circuit element identifier and/or adding the determined circuit element identifier to an existing RO that is already stored in a data storage device. In either case, the RO at issue would be an RO associated with the particular vehicle, such as with the particular vehicle's vehicle identifier.

In some cases, the at least one processor may generate the reply so that the reply additionally or alternatively includes relevant information other than the determined circuit element identifier. For example, the at least one processor could generate the reply to include the received vehicle identifier, the received first symptom identifier, the received second symptom identifier, the stored vehicle identifier, the stored first symptom identifier, and/or the stored second symptom identifier, among other options. Other examples are also possible.

In another aspect, generating the reply could involve generating the reply to include a stored graphical representation of the circuit element identified by the determined circuit element identifier. In practice, the graphical representation could be a schematic diagram and/or an image that illustrates at least the circuit element, among other options.

In this aspect, the determined circuit element identifier could be the graphical representation itself and/or could be an identifier of the graphical representation stored in the computer-readable memory. Therefore, the at least one processor could include the graphical representation due to the graphical representation or an identifier of the graphical representation being mapped to the stored vehicle identifier, the stored first symptom identifier, and the stored second symptom identifier.

Alternatively, the determined circuit element identifier could be mapped to the graphical representation, and thus the graphical representation could be included in the reply based on this mapping. In particular, the computer-readable memory could have stored thereon an identifier-graphics mapping data that maps each of a plurality of circuit element identifiers respectively to one or more graphical representations of the corresponding circuit element. As such, when the at least one processor determines the circuit element identifier to include in the reply, the at least one processor could determine that the graphical representation at issue should also be included in the reply based on the determined circuit element identifier being mapped to this graphical representation as part of the stored identifier-graphics mapping data.

In some situations, the graphical representation could illustrate other relevant feature(s) and/or information in addition to illustrating the circuit element at issue. In one example, the graphical representation could illustrate the above-described first vehicle component to which the circuit element is connected or is a part of and/or the above-described second vehicle component to which the circuit element is connected or is a part of. In this regard, the graphical representation could illustrate that the circuit element is connected to or is a part of the first vehicle component and/or that the circuit element is connected to or is a part of the second vehicle component. In another example, the graphical representation could illustrate the first symptom that might be exhibited due to a problem with the circuit element, such as by listing the first symptom identifier that identifies the first symptom. Additionally or alternatively, the graphical representation could illustrate the second symptom that might be exhibited due to a problem with the circuit element, such as by listing the second symptom identifier that identifies the second symptom. Other examples are possible as well.

Moreover, the at least one processor could effectively filter out a graphical representation to only illustrate select information and/or features. More specifically, a particular graphical representation that illustrates the circuit element may additionally illustrate other information and/or features. For instance, the particular graphical representation may illustrate other circuit elements. Given this, the at least one processor may generate a new graphical representation based on the particular graphical representation such that the new graphical representation illustrates only the circuit element, and perhaps other relevant feature(s) and/or information in line with the discussion above.

For example, the at least one processor may crop a particular image that illustrates the circuit element at issue, the first and second vehicle components, and other vehicle components to form a new image that illustrates just the circuit element at issue and the first and second vehicle components. In another example, given a particular schematic diagram illustrating a particular circuit that includes the circuit element at issue and also illustrating other circuits, the at least one processor could remove the other circuit from the schematic diagram so as to result in a new schematic diagram that illustrates just the particular circuit including the circuit element at issue. Other examples are also possible.

At block 608, method 600 involves outputting, by the at least one processor, the generated reply to the request. Generally, outputting the generated reply to the request could take various forms.

By way of example, outputting the generated reply could involve causing a display device to display the generated reply. For instance, the display device displaying the generated reply may be part of a computing system that includes the at least one processor that generated the generated reply (e.g., a display device of VRT 900) and/or may be a display device of an external computing device that is separate from the computing system that includes the at least one processor (e.g., a display device of a customer's mobile phone), among other options. As such, the displayed generated reply may help provide information based on which a repair shop can then repair a particular vehicle, among other advantages.

To illustrate, refer again to FIG. 1 showing that the VRD system 102 may output a reply 124 to a request. In particular, this reply 124 could be displayed as part of a GUI on a display device of the VRD system. In another case, as shown in FIG. 3, VRT 300 displays a reply 314 to a request as part of the user interface 302. In this regard, the VRD system 102 could transmit the reply 124 to one or more of the VRTs 106-120 (and/or to other devices) such that a VRT could display this reply 124. Additionally or alternatively, the VRT 300 could transmit the reply 314 to the VRD system 102 such that the VRD system 102 could display this reply 314. Other cases are also possible.

Figure 11:
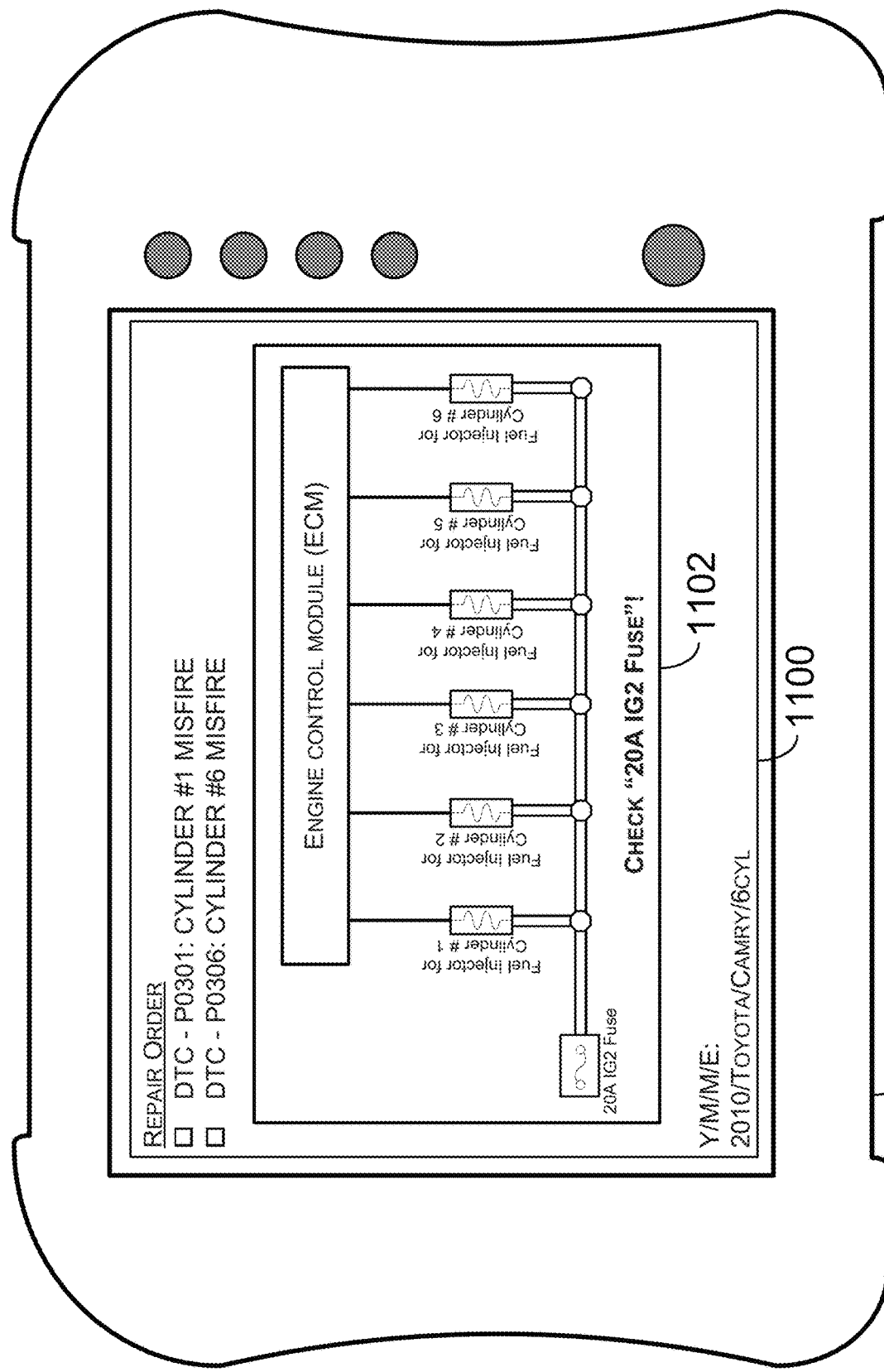
FIG. 11 illustrates an output of the reply to the request in accordance with one or more example embodiments.

Furthermore, FIG. 11 illustrates a more specific example of outputting a generated reply to a request. As shown, a display device of the VRT 900 is displaying a generated repair order 1100 associated with vehicle 904 introduced in FIG. 9. More specifically, due to the VRT 900 determining that the "20A IG2 Fuse" is the circuit element identifier 1000 to include based on the mapping 802, the displayed repair order 1100 lists the vehicle identifier "2010 Toyota Camry", the first symptom identifier "DTC-P0301", and the second symptom identifier "DTC-P0306" of the mapping 802. Moreover, the displayed repair order 1100 includes a graphical representation 1102 illustrating the ECM 700, the fuel injectors 702A-702F, and the 20A IG2 Fuse 704, and showing a statement "Check '20A IG2 Fuse'!" so as to point out the circuit element that should be evaluated as part of a repair. In this way, a repair shop could then repair the 20A IG2 Fuse in order to resolve the symptoms identified by the DTCs P0301 and P0306. Other illustrations are also possible.

In other examples, outputting the generated reply could additionally or alternatively involve causing an audio output device (e.g., a speaker system) to emit an audible indication corresponding to the generated reply. For instance, the audio output device emitting the audible indication may be part of a computing system that includes the at least one processor that generated the generated reply (e.g., a display device of VRT 900) and/or may be an audio output device of an external computing device that is separate from the computing system that includes the at least one processor (e.g., a speaker of a customer's mobile phone), among other options. As such, the emitted audible indication corresponding to the generated reply may help provide information based on which a repair shop can then repair a particular vehicle, among other advantages. Other examples are possible as well.

In yet a further aspect, the at least one processor may sometimes determine multiple circuit element identifiers that could possibly be included in a reply to the request. For example, the circuit-element mapping data may include at least first and second circuit element identifiers that are each mapped to the same stored vehicle identifier, stored first symptom identifier, and stored second symptom identifier. Generally, the first circuit element identifier may represent a first circuit element and the second circuit element identifier may represent a second circuit element. In practice, the first and second circuit elements could be respectively connected to and/or respectively be part of the same vehicle component (s). Additionally or alternatively, the first and second circuit elements could be respectively connected to and/or could respectively be part of different vehicle component(s). Nonetheless, these vehicle components at issue could cause a vehicle identified by the stored vehicle identifier to exhibit the symptoms identified by the stored first and second symptom identifiers.

Given this, if the at least one processor receives a request including a vehicle identifier, a first symptom identifier, and a second symptom identifier, the at least one processor could make a determination that these identifiers respectively match and/or are mapped to the stored vehicle identifier, stored first symptom identifier, and stored second symptom identifier at issue. And based on the first and second circuit element identifiers being mapped to the stored vehicle identifier, stored first symptom identifier, and stored second symptom identifier, the at least one processor could determine that both the first and second circuit element identifiers are candidates to be included in the reply to the request.

In one implementation, when the at least one processor determines that multiple circuit element identifiers are candidates to be included in the reply to the request, the at least one processor could include each such circuit element identifier in the reply to request. For example, based on both the first and second circuit element identifiers being mapped to the stored vehicle identifier, stored first symptom identifier, and stored second symptom identifier, the at least one processor may determine that both the first and second circuit element identifier should be included in the reply to the request. As such, the at least one processor may generate the reply in line with the discussion above such that the reply includes both the first and second circuit element identifiers.

In another implementation, however, when the at least one processor determines that multiple circuit element identifiers are candidates to be included in the reply to the request, the at least one processor could select one or more of these candidate circuit element identifiers and could include just the selected one or more circuit element identifiers in the reply to request. For example, in response to determining that both the first and second circuit element identifiers are candidates to be included in the reply to the request, the at least one processor could make a circuit-element comparison corresponding to a comparison between the first and second circuit element identifiers. In this way, the at least one processor could determine a particular circuit element identifier to include in the reply based on the circuit-element comparison. For instance, based on the circuit-element comparison, the at least one processor could select the first circuit element identifier rather than the second circuit element identifier as the circuit element identifier to include in the reply to the request, and could then generate the reply to the request to include the first circuit element identifier rather than to include the second circuit element identifier.

Generally, a circuit-element comparison could be a comparison between various diagnostic statistics associated with circuit element identifiers, among other possibilities. In particular, the computer-readable memory could have stored thereon a plurality of diagnostic statistics each respectively associated with one or more circuit element identifiers (e.g., diagnostic statistics 238 stored in data storage device 210). In this regard, the at least one processor could respectively determine each such diagnostic statistic based on information found in one or more respective ROs, such as based on repair information related to circuit element(s) represented by the associated circuit element identifier(s). In other cases, however, the at least one processor could determine each such diagnostic statistic based on other information. In either case, the circuit-element comparison could involve, for instance, a diagnostic-statistic comparison between a first diagnostic statistic associated with the above-mentioned first circuit element identifier and a second diagnostic statistic associated with the above-mentioned second circuit element identifier.

By way of example, the diagnostic-statistic comparison could involve a comparison between (i) how likely a repair of a given circuit element is to resolve the multiple symptoms being exhibited by a vehicle and (ii) how likely a repair of another circuit element is to resolve the multiple symptoms being exhibited by the vehicle. In particular, assuming that a particular vehicle is exhibiting first and second symptoms respectively identified by first and second symptom identifiers and that the above-mentioned first and second circuit element identifiers respectively identify first and second circuit elements of the particular vehicle, the at least one processor could compare how effective a repair of the first circuit element has been in resolving the first and second symptoms to how effective a repair of the second circuit element has been in resolving the first and second symptoms.

More specifically, the first diagnostic statistic could represents a first quantity (or percentage) of vehicles that exhibited the first symptom and the second symptom and were repaired by servicing the first circuit element such that the vehicles no longer exhibited the first symptom and the second symptom. Whereas, the second diagnostic statistic represents a second quantity (or percentage) of vehicles that exhibited the first symptom and the second symptom and were repaired by servicing the second circuit element such that the vehicles no longer exhibited the first symptom and the second symptom. Generally, the vehicles being evaluated in this example could be vehicles that have each have at least one vehicle attribute that is the same as that of the particular vehicle.

Nonetheless, in this example, the at least one processor could then select a circuit element identifier to include in the reply based on the diagnostic-statistic comparison. For instance, based on the diagnostic-statistic comparison, the at least one processor could determine that the first quantity (or first percentage) is greater than the second quantity (or second percentage). Generally, such a determination amounts to a determination that repair of the first circuit element has been more effective (and is thus more likely) than repair of the second circuit element to help resolve the first and second symptoms exhibited by the particular vehicle. Therefore, the at least one processor could respond to determining that the first quantity (or first percentage) is greater than the second quantity (or second percentage) by selecting the first circuit element identifier rather than the second circuit element identifier as the circuit element identifier to include in the reply to the request.

In another example, the diagnostic-statistic comparison could involve a comparison between (i) how long it would take to diagnose and/or repair of a given circuit element so as to resolve the multiple symptoms being exhibited by a vehicle and (ii) how long it would take to diagnose and/or repair another circuit element so as to resolve the multiple symptoms being exhibited by the vehicle. In particular, again assuming that a particular vehicle is exhibiting first and second symptoms respectively identified by first and second symptom identifiers and that the above-mentioned first and second circuit element identifiers respectively identify first and second circuit elements of the particular vehicle, the at least one processor could compare the amount of time it could take to diagnose and/or repair the first circuit element to the amount of time it could take to diagnose and/or repair the second circuit element.

More specifically, the first diagnostic statistic could represent a first amount of time to diagnose and/or repair the first circuit element, and the second diagnostic statistic could represent a second amount of time to diagnose and/or repair the second circuit element. Given this, the at least one processor could then select a circuit element identifier to include based on this diagnostic-statistic comparison. For instance, based on the diagnostic-statistic comparison, the at least one processor could determine that the second amount of time is greater than the first amount of time. Generally, such a determination amounts to a determination that it would take a longer amount of time to diagnose and/or repair the second circuit element than it would take to diagnose and/or repair the first circuit element. Therefore, the at least one processor could respond to determining that the second amount of time is greater than the first amount of time by selecting the first circuit element identifier rather than the second circuit element identifier as the circuit element identifier to include in the reply to the request. Other examples are also possible.

IV. Second Example Operations

In accordance with an example implementation, at least one processor may be configured to carry out any of the operations disclosed herein (e.g., the "first example operations") more broadly in the context of diagnostic identifier(s) rather than just in the context of symptom identifier(s). Generally, a diagnostic identifier could be any feasible identifier that helps identify a problem with a vehicle. Given this, in some cases, a diagnostic identifier could be a symptom identifier in line with the discussion above. In other cases, however, a diagnostic identifier could be a vehicle component identifier (also referred to herein as a component identifier). In practice, for example, a component identifier could be a component/part name, a component/part number, a component/part description, a graphical representation of a component/part, a system name, a system number, a system description, a graphical representation of a system, a sub-system name, a sub-system number, a sub-system description, and/or a graphical representation of a sub-system, among other option possibilities. Other instances and examples are possible as well.

Accordingly, FIG. 12 is a flowchart illustrating a method 1200, according to an example implementation. Method 1200 corresponds to method 600, but is carried out in the context of diagnostic identifier(s). Therefore, any of the operations described herein in the context of method 600 could extend to apply in the context of method 1200.

At block 1202, method 1200 involves receiving, by at least one processor (e.g., processor 204 and/or processor 304) configured to search a computer-readable memory (e.g., data storage device 210 and/or data storage 308), a request comprising a vehicle identifier, a first diagnostic identifier, and a second diagnostic identifier, where the computer-readable memory has stored thereon a particular circuit element identifier that is mapped to a stored vehicle identifier, a stored first diagnostic identifier, and a stored second diagnostic identifier, wherein the stored vehicle identifier represents a particular vehicle having at least first and second vehicle components, where the stored first diagnostic identifier is associated with the first vehicle component, where the stored second diagnostic identifier is associated with the second vehicle component, and where the particular circuit element identifier represents a circuit element that is connected to or is a part of the first vehicle component and that is connected to or is a part of the second vehicle component.

At block 1204, method 1200 then involves, in response to receiving the request, determining, by the at least one processor, a circuit element identifier to include in a reply to the request, where determining the circuit element identifier to include comprises: (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier.

At block 1206, method 1200 then involves generating, by the at least one processor, the reply to the request, where generating the reply comprises generating the reply to include the determined circuit element identifier.

At block 1208, method 1200 then involves outputting, by the at least one processor, the generated reply to the request.

In one case, method 1200 may be carried in the context of the diagnostic identifier(s) being symptom identifier(s) in line with the method 600. In particular, the stored first diagnostic identifier may be a stored first symptom identifier. In this regard, the stored first diagnostic identifier being associated with the first vehicle component could involve the stored first symptom identifier representing a first symptom that the first vehicle component can cause the particular vehicle to exhibit. Additionally, the stored second diagnostic identifier may be a stored second symptom identifier. In this regard, the stored second diagnostic identifier being associated with the second vehicle component could involve the stored second symptom identifier representing a second symptom that the second vehicle component can cause the particular vehicle to exhibit. Finally, the received first diagnostic identifier may be a received first symptom identifier and the received second diagnostic identifier may be a received second symptom identifier.

In another case, method 1200 may be carried in the context of the diagnostic identifier(s) being component identifier(s). In particular, the stored first diagnostic identifier may be a stored first component identifier. In this regard, the stored first diagnostic identifier being associated with the first vehicle component could involve the stored first component identifier being representative of the first vehicle component. Additionally, the stored second diagnostic identifier may be a stored second component identifier. In this regard, the stored second diagnostic identifier being associated with the second vehicle component could involve the stored second component identifier being representative of the second vehicle component. Finally, the received first diagnostic identifier may be a received first component identifier and the received second diagnostic identifier may be a received second component identifier.

In yet another case, method 1200 may be carried in the context of certain diagnostic identifier(s) being component identifier(s) and other diagnostic identifier(s) being symptom identifier(s). In particular, the stored first diagnostic identifier may be a stored symptom identifier. In this regard, the stored first diagnostic identifier being associated with the first vehicle component could involve the stored symptom identifier representing a symptom that the first vehicle component can exhibit. Additionally, the stored second diagnostic identifier may be a stored component identifier. In this regard, the stored second diagnostic identifier being associated with the second vehicle component could involve the stored component identifier being representative of the second vehicle component. Finally, the received first diagnostic identifier may be a received symptom identifier and the received second diagnostic identifier may be a received component identifier. Other cases are possible as well.

V. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor of a machine cause a set of functions to be performed, the set of functions comprising the features or functions of the aspects and embodiments described herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: receiving, by at least one processor configured to search a computer-readable memory, a request comprising a vehicle identifier, a first symptom identifier, and a second symptom identifier, wherein the computer-readable memory has stored thereon a particular circuit element identifier that is mapped to a stored vehicle identifier, a stored first symptom identifier, and a stored second symptom identifier, wherein the stored vehicle identifier represents a particular vehicle having at least first and second vehicle components, wherein the stored first symptom identifier represents a first symptom that the first vehicle component can cause the particular vehicle to exhibit, wherein the stored second symptom identifier represents a second symptom that the second vehicle component can cause the particular vehicle to exhibit, and wherein the particular circuit element identifier represents a circuit element that is connected to or is a part of the first vehicle component and that is connected to or is a part of the second vehicle component; in response to receiving the request, determining, by the at least one processor, a circuit element identifier to include in a reply to the request, wherein determining the circuit element identifier to include comprises: (i) making a determination that the received vehicle identifier matches or is mapped to the stored vehicle identifier, that the received first symptom identifier matches or is mapped to the stored first symptom identifier, and that the received second symptom identifier matches or is mapped to the stored second symptom identifier, and (ii) in response to making the determination, determining that the particular circuit element identifier is the circuit element identifier to include based on the particular circuit element identifier being mapped to the stored vehicle identifier, the stored first symptom identifier, and the stored second symptom identifier; generating, by the at least one processor, the reply to the request, wherein generating the reply comprises generating the reply to include the determined circuit element identifier; and outputting, by the at least one processor, the generated reply to the request.

EEE 2 is the method of EEE 1, wherein the first and second vehicle components are a same vehicle component.

EEE 3 is the method of EEE 1 or 2, wherein the first and second symptoms are a same symptom.

EEE 4 is the method of any one of EEE 1 to 3, wherein the first vehicle component can cause the particular vehicle to exhibit the first symptom while the second vehicle component causes the particular vehicle to exhibit the second symptom.

EEE 5 is the method of any one of EEE 1 to 4, wherein the circuit element comprises one or more of the following: a power source, an electrical ground, an electrical connector, a transistor, a capacitor, an inductor, a resistor, an integrated circuit, an electrical switch, an electrical fuse, an electrical relay, a semiconductor, a vacuum tube, a resonator, a transducer, a connector terminal, a conductor, a circuit breaker, a solenoid, a transmitter, a receiver, a transceiver, a splice ring, an electrical shield, a circuit board, a circuit board trace, an optical cable, an optical cable connector, an optical shield, and an optical switch.

EEE 6 is the method of any one of EEE 1 to 5, wherein the circuit element that is connected to or is a part of the first vehicle component comprises the circuit element being a part of the first vehicle component or being connected to the first vehicle component through one or more of the following: a first wired connection and a first wireless connection, and wherein the circuit element that is connected to or is a part of the second vehicle component comprises the circuit element being a part of the second vehicle component or being connected to the second vehicle component through one or more of the following: a second wired connection and a second wireless connection.

EEE 7 is the method of any one of EEE 1 to 6, wherein the stored first symptom identifier represents a first diagnostic trouble code (DTC), and wherein the stored second symptom identifier represents a second DTC or does not represent any DTC.

EEE 8 is the method of any one of EEE 1 to 7, wherein the received first symptom identifier represents a first diagnostic trouble code (DTC), and wherein the received second symptom identifier represents a second DTC or does not represent any DTC.

EEE 9 is the method of any one of EEE 1 to 8, wherein the determined circuit element identifier comprises one or more of the following: (i) a numeric circuit element identifier, (ii) an alphabetical circuit element identifier, (iii) an alpha-numeric circuit element identifier, and (iv) a schematic diagram circuit element identifier.

EEE 10 is the method of any one of EEE 1 to 9, further comprising: determining, by the at least one processor, a set of symptom identifiers associated with the received first symptom identifier and the received vehicle identifier, wherein the set of symptom identifiers comprises a symptom identifier matching the stored second symptom identifier; and outputting, by the at least one processor, a prompt to select one or more symptom identifiers from the set of symptom identifiers, wherein the at least one processor receives the vehicle identifier and the first symptom identifier before outputting the prompt, and wherein the at least one processor receives the second symptom identifier in response to the prompt.

EEE 11 is the method of any one of EEE 1 to 10, wherein generating the reply further comprises generating the reply to also include one or more of the following: (i) the received vehicle identifier, (ii) the received first symptom identifier, (iii) the received second symptom identifier, (iv) the stored vehicle identifier, (v) the stored first symptom identifier, and (vi) the stored second symptom identifier.

EEE 12 is the method of any one of EEE 1 to 11, wherein the particular circuit element identifier (i) is mapped to a particular graphical representation of the circuit element that is stored on the computer-readable memory or (ii) is the particular graphical representation of the circuit element, and wherein generating the reply comprises generating the reply to include the particular graphical representation of the circuit element.

EEE 13 is the method of EEE 12, further comprising: in response to determining that the particular circuit element identifier is the circuit element identifier to include, determining that the particular graphical representation is also to be included in the reply based on the particular circuit element identifier being mapped to the particular graphical representation, and wherein generating the reply to include the particular graphical representation is responsive to determining that the particular graphical representation is also to be included.

EEE 14 is the method of EEE 12 or 13, wherein the particular graphical representation illustrates one or both of the first and second vehicle components.

EEE 15 is the method of any one of EEE 12 to 14, wherein the particular graphical representation also illustrates one or both of the following: (i) that the circuit element is connected to or is a part of the first vehicle component and (ii) that the circuit element is connected to or is a part of the second vehicle component.

EEE 16 is the method of any one of EEE 12 to 15, wherein the particular graphical representation illustrates one or both of the first and second symptoms.

EEE 17 is the method of any one of EEE 12 to 16, wherein the particular graphical representation comprises a schematic diagram that illustrates the circuit element.

EEE 18 is the method of any one of EEE 1 to 17, wherein receiving the request comprises receiving one or more of the following from an electronic control unit (ECU) of the particular vehicle via a vehicle repair tool (VRT) removably connected to the ECU: the vehicle identifier, the first symptom identifier, and the second symptom identifier.

EEE 19 is the method of any one of EEE 1 to 17, wherein receiving the request comprises receiving one or more of the following from a vehicle repair tool (VRT): the vehicle identifier, the first symptom identifier, and the second symptom identifier.

EEE 20 is the method of any one of EEE 1 to 19, wherein outputting the reply to the request comprises causing a display device of a vehicle repair tool (VRT) to display the reply to the request.

EEE 21 is the method of any one of EEE 1 to 20, wherein the particular circuit element identifier comprises a first circuit element identifier, wherein the circuit element comprises a first circuit element, wherein the computer-readable memory has stored thereon a second circuit element identifier that is also mapped to the stored vehicle identifier, the stored first symptom identifier, and the stored second symptom identifier, and wherein the second circuit element identifier represents a second circuit element.

EEE 22 is the method of EEE 21, wherein determining the circuit element identifier to include further comprises, in response to making the determination, determining that the second circuit element identifier is another circuit element identifier to include based on the second circuit element identifier also being mapped to the stored vehicle identifier, the stored first symptom identifier, and the stored second symptom identifier, and wherein generating the reply to include the determined circuit element identifier comprises generating the reply to include the first and second circuit element identifiers.

EEE 23 is the method of EEE 21, wherein determining that the particular circuit element identifier is the circuit element identifier to include comprises determining that the first circuit element identifier is a candidate to be the circuit element identifier to include, wherein determining the circuit element identifier to include further comprises: in response to making the determination, determining that the second circuit element identifier is also a candidate to be the circuit element identifier to include based on the second circuit element identifier being mapped to the stored vehicle identifier, the stored first symptom identifier, and the stored second symptom identifier; and in response to determining that the first and second circuit element identifiers are both candidates to be the circuit element identifier to include, making a circuit-element comparison between the first and second circuit element identifiers, wherein determining that the particular circuit element identifier is the circuit element identifier to include is further based on the circuit-element comparison, and wherein determining that the particular circuit element identifier is the circuit element identifier to include based on the circuit-element comparison comprises, based on the circuit-element comparison, selecting the first circuit element identifier rather than the second circuit element identifier as the circuit element identifier to include in the reply to the request.

EEE 24 is the method of EEE 23, wherein the computer-readable memory has stored thereon a first diagnostic statistic associated with the first circuit element identifier and a second diagnostic statistic associated with the second circuit element identifier, and wherein making the circuit-element comparison between the first and second circuit element identifiers comprises making a diagnostic-statistic comparison between the first diagnostic statistic and the second diagnostic statistic.

EEE 25 is the method of EEE 24, wherein the computer-readable memory has stored thereon a plurality of computer-readable vehicle repair orders (ROs), the method further comprising: determining, by the at least one processor, the first diagnostic statistic based on one or more of the plurality of ROs; and determining, by the at least one processor, the second diagnostic statistic based on one or more of the plurality of ROs.

EEE 26 is the method of EEE 24, wherein the first diagnostic statistic represents a first quantity of vehicles that exhibited the first symptom and the second symptom and were repaired by servicing the first circuit element such that the vehicles no longer exhibited the first symptom and the second symptom, wherein the second diagnostic statistic represents a second quantity of vehicles that exhibited the first symptom and the second symptom and were repaired by servicing the second circuit element such that the vehicles no longer exhibited the first symptom and the second symptom, and wherein selecting first circuit element identifier based on the circuit-element comparison comprises: (i) based on the diagnostic-statistic comparison, determining that the first quantity is greater than the second quantity, and (ii) in response to determining that the first quantity is greater than the second quantity, selecting the first circuit element identifier rather than the second circuit element identifier as the circuit element identifier to include in the reply to the request.

EEE 27 is the method of EEE 26, wherein the vehicles of the first and second quantities have a same vehicle attribute as the particular vehicle, and wherein the vehicle attribute comprises one or more of the following: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, and (x) a vehicle fuel system type.

EEE 28 is the method of EEE 24, wherein the first diagnostic statistic represents a first amount of time to diagnose the first circuit element, wherein the second diagnostic statistic represents a second amount of time to diagnose the second circuit element, and wherein selecting first circuit element identifier based on the circuit-element comparison comprises: (i) based on the diagnostic-statistic comparison, determining that the second amount of time is greater than the first amount of time, and (ii) in response to determining that the second amount of time is greater than the first amount of time, selecting the first circuit element identifier rather than the second circuit element identifier as the circuit element identifier to include in the reply to the request.

EEE 29 is a computing system comprising: a computer-readable memory having stored thereon a particular circuit element identifier that is mapped to a stored vehicle identifier, a stored first symptom identifier, and a stored second symptom identifier, wherein the stored vehicle identifier represents a particular vehicle having at least first and second vehicle components, wherein the stored first symptom identifier represents a first symptom that the first vehicle component can cause the particular vehicle to exhibit, wherein the stored second symptom identifier represents a second symptom that the second vehicle component can cause the particular vehicle to exhibit, and wherein the particular circuit element identifier represents a circuit element that is connected to or is a part of the first vehicle component and that is connected to or is a part of the second vehicle component; at least one processor configured to search the computer-readable memory; and program instructions stored on the computer-readable memory and executable by the at least one processor to cause a set of functions to be performed, the set of functions comprising a method in accordance with any one of EEEs 1 to 28.

EEE 30 is a method comprising: receiving, by at least one processor configured to search a computer-readable memory, a request comprising a vehicle identifier, a first diagnostic identifier, and a second diagnostic identifier, wherein the computer-readable memory has stored thereon a particular circuit element identifier that is mapped to a stored vehicle identifier, a stored first diagnostic identifier, and a stored second diagnostic identifier, wherein the stored vehicle identifier represents a particular vehicle having at least first and second vehicle components, wherein the stored first diagnostic identifier is associated with the first vehicle component, wherein the stored second diagnostic identifier is associated with the second vehicle component, and wherein the particular circuit element identifier represents a circuit element that is connected to or is a part of the first vehicle component and that is connected to or is a part of the second vehicle component; in response to receiving the request, determining, by the at least one processor, a circuit element identifier to include in a reply to the request, wherein determining the circuit element identifier to include comprises: (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier; generating, by the at least one processor, the reply to the request, wherein generating the reply comprises generating the reply to include the determined circuit element identifier; and outputting, by the at least one processor, the generated reply to the request.

EEE 31 is the method of EEE 30, wherein the stored first diagnostic identifier comprises a stored first symptom identifier, wherein the stored first diagnostic identifier being associated with the first vehicle component comprises the stored first symptom identifier representing a first symptom that the first vehicle component can cause the particular vehicle to exhibit, wherein the stored second diagnostic identifier comprises a stored second symptom identifier, wherein the stored second diagnostic identifier being associated with the second vehicle component comprises the stored second symptom identifier representing a second symptom that the second vehicle component can cause the particular vehicle to exhibit, wherein the received first diagnostic identifier comprises a received first symptom identifier, and wherein the received second diagnostic identifier comprises a received second symptom identifier.

EEE 32 is the method of EEE 30, wherein the stored first diagnostic identifier comprises a stored first component identifier, wherein the stored first diagnostic identifier being associated with the first vehicle component comprises the stored first component identifier being representative of the first vehicle component, wherein the stored second diagnostic identifier comprises a stored second component identifier, wherein the stored second diagnostic identifier being associated with the second vehicle component comprises the stored second component identifier being representative of the second vehicle component, wherein the received first diagnostic identifier comprises a received first component identifier, and wherein the received second diagnostic identifier comprises a received second component identifier.

EEE 33 is the method of EEE 30, wherein the stored first diagnostic identifier comprises a stored symptom identifier, wherein the stored first diagnostic identifier being associated with the first vehicle component comprises the stored symptom identifier representing a symptom that the first vehicle component can exhibit, wherein the stored second diagnostic identifier comprises a stored component identifier, wherein the stored second diagnostic identifier being associated with the second vehicle component comprises the stored component identifier being representative of the second vehicle component, wherein the received first diagnostic identifier comprises a received symptom identifier, and wherein the received second diagnostic identifier comprises a received component identifier.

EEE 34 is a computing system comprising: a computer-readable memory having stored thereon a particular circuit element identifier that is mapped to a stored vehicle identifier, a stored first diagnostic identifier, and a stored second diagnostic identifier, wherein the stored vehicle identifier represents a particular vehicle having at least first and second vehicle components, wherein the stored first diagnostic identifier is associated with the first vehicle component, wherein the stored second diagnostic identifier is associated with the second vehicle component, and wherein the particular circuit element identifier represents a circuit element that is connected to or is a part of the first vehicle component and that is connected to or is a part of the second vehicle component; at least one processor configured to search the computer-readable memory; and program instructions stored on the computer-readable memory and executable by the at least one processor to cause a set of functions to be performed, the set of functions comprising a method in accordance with any one of EEEs 30 to 33.

EEE 35 is a computer-readable medium storing program instructions, that when executed by a computing device, cause a set of functions to be performed, the set of functions comprising a method in accordance with any one of EEEs 1 to 29.

EEE 36 is a computer-readable medium storing program instructions, that when executed by a computing device, cause a set of functions to be performed, the set of functions comprising a method in accordance with any one of EEEs 30 to 33.

We claim:

1. A method comprising:
receiving, by one or more processors configured to search a non-transitory computer-readable memory, a received first diagnostic identifier, a received second diagnostic identifier, and a request comprising a received vehicle identifier, wherein:

the non-transitory computer-readable memory has stored thereon a table that maps multiple circuit element identifiers to a respective group of identifiers including a respective vehicle identifier, a respective first diagnostic identifier and a respective second diagnostic identifier, the table includes a particular circuit element identifier that is mapped to a stored vehicle identifier, a stored first diagnostic identifier, and a stored second diagnostic identifier, the stored vehicle identifier represents a particular vehicle having at least first and second vehicle components, the first vehicle component and the second vehicle component are different components, the stored first diagnostic identifier is associated with the first vehicle component, the stored second diagnostic identifier is associated with the second vehicle component, and the particular circuit element identifier represents a circuit element that is connected to or is a part of the first vehicle component and that is connected to the second vehicle component, that is capable of causing the first vehicle component to cause the particular vehicle to exhibit a first symptom that is related to the stored first diagnostic identifier, and that is capable of causing the second vehicle component to cause the particular vehicle to exhibit a second symptom that is related to the stored second diagnostic identifier;

in response to receiving the request, determining, by the one or more processors, a circuit element identifier to include in a reply to the request, wherein determining the circuit element identifier to include comprises: (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier;

generating, by the one or more processors, the reply to the request, wherein generating the reply comprises generating the reply to include the determined circuit element identifier; and outputting, by the one or more processors, the generated reply to the request.

2. The method according to claim 1, wherein:
the stored first diagnostic identifier comprises a stored first symptom identifier,
the stored first diagnostic identifier being associated with the first vehicle component comprises the stored first symptom identifier representing a first symptom that the first vehicle component can cause the particular vehicle to exhibit,
the stored second diagnostic identifier comprises a stored second symptom identifier,
the stored second diagnostic identifier being associated with the second vehicle component comprises the stored second symptom identifier representing a second symptom that the second vehicle component can cause the particular vehicle to exhibit, the received first diagnostic identifier comprises a received first symptom identifier, and the received second diagnostic identifier comprises a received second symptom identifier.

3. The method according to claim 1, wherein:

the stored first diagnostic identifier comprises a stored first component identifier, the stored first diagnostic identifier being associated with the first vehicle component comprises the stored first component identifier being representative of the first vehicle component, the stored second diagnostic identifier comprises a stored second component identifier, the stored second diagnostic identifier being associated with the second vehicle component comprises the stored second component identifier being representative of the second vehicle component, the received first diagnostic identifier comprises a received first component identifier, and the received second diagnostic identifier comprises a received second component identifier.

4. The method according to claim 1, wherein:

the stored first diagnostic identifier comprises a stored symptom identifier, the stored first diagnostic identifier being associated with the first vehicle component comprises the stored symptom identifier representing a symptom that the first vehicle component can exhibit, the stored second diagnostic identifier comprises a stored component identifier, the stored second diagnostic identifier being associated with the second vehicle component comprises the stored component identifier being representative of the second vehicle component, the received first diagnostic identifier comprises a received symptom identifier, and the received second diagnostic identifier comprises a received component identifier, and optionally, the first and second symptoms are a same symptom.

5. The method according to claim 1, wherein the first vehicle component can cause the particular vehicle to exhibit the first symptom while the second vehicle component causes the particular vehicle to exhibit the second symptom.

6. The method according to claim 1, wherein the circuit element comprises one or more of the following: a power source, an electrical ground, an electrical connector, a transistor, a capacitor, an inductor, a resistor, an integrated circuit, an electrical switch, an electrical fuse, an electrical relay, a semiconductor, a vacuum tube, a resonator, a transducer, a connector terminal, a conductor, a circuit breaker, a solenoid, a transmitter, a receiver, a transceiver, a splice ring, an electrical shield, a circuit board, a circuit board trace, an optical cable, an optical cable connector, an optical shield, or an optical switch.

7. The method according to claim 1, wherein the circuit element that is connected to or is a part of the first vehicle component comprises the circuit element being a part of the first vehicle component or being connected to the first vehicle component through one or more of the following: a first wired connection or a first wireless connection, and wherein the circuit element that is connected to the second vehicle component comprises the circuit element being connected to the second vehicle component through one or more of the following: a second wired connection or a second wireless connection.

8. The method according to claim 1, wherein the stored first diagnostic identifier represents a first diagnostic trouble code (DTC), and wherein the stored second diagnostic identifier represents a second DTC or does not represent any DTC.

9. The method according to claim 1, wherein the received first diagnostic identifier represents a first diagnostic trouble code (DTC), and wherein the received second diagnostic identifier represents a second DTC or does not represent any DTC.

10. The method according to claim 1, wherein the determined circuit element identifier comprises one or more of the following: (i) a numeric circuit element identifier, (ii) an alphabetical circuit element identifier, (iii) an alpha-numeric circuit element identifier, or (iv) a schematic diagram circuit element identifier.

11. The method according to claim 1, further comprising:

determining, by the one or more processors, a set of symptom identifiers associated with the received first diagnostic identifier and the received vehicle identifier, wherein the set of symptom identifiers comprises a symptom identifier matching the stored second diagnostic identifier; and outputting, by the one or more processors, a prompt to select one or more symptom identifiers from the set of symptom identifiers, wherein the one or more processors receives the received vehicle identifier and the received first diagnostic identifier before outputting the prompt, and wherein the one or more processors receives the received second diagnostic identifier in response to the prompt.

12. The method according to claim 1, wherein generating the reply further comprises generating the reply to also include one or more of the following: (i) the received vehicle identifier, (ii) the received first diagnostic identifier, (iii) the received second diagnostic identifier, (iv) the stored vehicle identifier, (v) the stored first diagnostic identifier, or (vi) the stored second diagnostic identifier.

13. The method according to claim 1, wherein the particular circuit element identifier (i) is mapped to a particular graphical representation of the circuit element that is stored on the non-transitory computer-readable memory or (ii) is the particular graphical representation of the circuit element, and wherein generating the reply comprises generating the reply to include the particular graphical representation of the circuit element.

14. The method according to claim 13, further comprising:

in response to determining that the particular circuit element identifier is the circuit element identifier to include, determining that the particular graphical representation is also to be included in the reply based on the particular circuit element identifier being mapped to the particular graphical representation, and wherein generating the reply to include the particular graphical representation is responsive to determining that the particular graphical representation is also to be included.

15. The method according to claim 13, wherein:

the particular graphical representation illustrates one or both of the first and second vehicle components, and optionally, the particular graphical representation also illustrates one or both of the following: (i) that the circuit element is connected to or is a part of the first vehicle component, or (ii) that the circuit element is connected to the second vehicle component.

16. The method according to claim 13, wherein the particular graphical representation illustrates one or both of the first and second symptoms.

17. The method according to claim 1, wherein receiving the request comprises receiving one or more of the following from a vehicle repair tool or from an electronic control unit (ECU) of the particular vehicle via a vehicle repair tool removably connected to the ECU: the received vehicle identifier, the received first diagnostic identifier, or the received second diagnostic identifier.

18. The method according to claim 1, wherein outputting the reply to the request comprises causing a display device of a vehicle repair tool to display the reply to the request.

19. The method according to claim 1, wherein:
the particular circuit element identifier comprises a first circuit element identifier,
the circuit element comprises a first circuit element,
the non-transitory computer-readable memory has stored thereon a second circuit element identifier that is also mapped to the stored vehicle identifier, the stored first diagnostic identifier, and the stored second diagnostic identifier, and
the second circuit element identifier represents a second circuit element.

20. The method according to claim 19,
wherein determining the circuit element identifier to include further comprises, in response to making the determination, determining that the second circuit element identifier is another circuit element identifier to include based on the second circuit element identifier also being mapped to the stored vehicle identifier, the stored first diagnostic identifier, and the stored second diagnostic identifier, and
wherein generating the reply to include the determined circuit element identifier comprises generating the reply to include the first and second circuit element identifiers.

21. The method according to claim 19, wherein determining that the particular circuit element identifier is the circuit element identifier to include comprises determining that the first circuit element identifier is a candidate to be the circuit element identifier to include, wherein determining the circuit element identifier to include further comprises:
in response to making the determination, determining that the second circuit element identifier is also a candidate to be the circuit element identifier to include based on the second circuit element identifier being mapped to the stored vehicle identifier, the stored first diagnostic identifier, and the stored second diagnostic identifier; and
in response to determining that the first and second circuit element identifiers are both candidates to be the circuit element identifier to include, making a circuit-element comparison between the first and second circuit element identifiers,
wherein determining that the particular circuit element identifier is the circuit element identifier to include is further based on the circuit-element comparison, and
wherein determining that the particular circuit element identifier is the circuit element identifier to include based on the circuit-element comparison comprises, based on the circuit-element comparison, selecting the first circuit element identifier rather than the second circuit element identifier as the circuit element identifier to include in the reply to the request.

22. The method according to claim 21,
wherein the non-transitory computer-readable memory has stored thereon a first diagnostic statistic associated with the first circuit element identifier and a second diagnostic statistic associated with the second circuit element identifier, and
wherein making the circuit-element comparison between the first and second circuit element identifiers comprises making a diagnostic-statistic comparison between the first diagnostic statistic and the second diagnostic statistic.

23. The method according to claim 22, wherein the non-transitory computer-readable memory has stored thereon a plurality of computer-readable vehicle repair orders, the method further comprising:
determining, by the one or more processors, the first diagnostic statistic based on one or more of the plurality of computer-readable vehicle repair orders; and
determining, by the one or more processors, the second diagnostic statistic based on one or more of the plurality of computer-readable vehicle repair orders.

24. The method according to claim 22,
wherein the first diagnostic statistic represents a first quantity of vehicles that exhibited the first symptom and the second symptom and were repaired by servicing the first circuit element such that the vehicles no longer exhibited the first symptom and the second symptom,
wherein the second diagnostic statistic represents a second quantity of vehicles that exhibited the first symptom and the second symptom and were repaired by servicing the second circuit element such that the vehicles no longer exhibited the first symptom and the second symptom, and
wherein selecting first circuit element identifier based on the circuit-element comparison comprises:
(i) based on the diagnostic-statistic comparison, determining that the first quantity is greater than the second quantity, and
(ii) in response to determining that the first quantity is greater than the second quantity, selecting the first circuit element identifier rather than the second circuit element identifier as the circuit element identifier to include in the reply to the request.

25. The method according to claim 24, wherein the vehicles of the first and second quantities have a same vehicle attribute as the particular vehicle, and wherein the vehicle attribute comprises one or more of the following: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, or (x) a vehicle fuel system type.

26. The method according to claim 22,
wherein the first diagnostic statistic represents a first amount of time to diagnose the first circuit element,
wherein the second diagnostic statistic represents a second amount of time to diagnose the second circuit element, and
wherein selecting first circuit element identifier based on the circuit-element comparison comprises:
(i) based on the diagnostic-statistic comparison, determining that the second amount of time is greater than the first amount of time, and (ii) in response to determining that the second amount of time is greater than the first amount of time, selecting the first circuit element identifier rather than the second circuit element identifier as the circuit element identifier to include in the reply to the request.

27. A computing system comprising:
a non-transitory computer-readable memory having stored thereon a table that: maps multiple circuit element identifiers to a respective group of identifiers including a respective vehicle identifier, a respective first diagnostic identifier and a respective second diagnostic identifier, and includes a particular circuit element identifier that is mapped to a stored vehicle identifier, a stored first diagnostic identifier, and a stored second diagnostic identifier, wherein:
   the stored vehicle identifier represents a particular vehicle having at least first and second vehicle components,
   the first vehicle component and the second vehicle component are different components,
   the stored first diagnostic identifier is associated with the first vehicle component,
   the stored second diagnostic identifier is associated with the second vehicle component, and
   the particular circuit element identifier represents a circuit element that is connected to or is a part of the first vehicle component and that is connected to the second vehicle component, that is capable of causing the first vehicle component to cause the particular vehicle to exhibit a first symptom that is related to the stored first diagnostic identifier, and that is capable of causing the second vehicle component to cause the particular vehicle to exhibit a second symptom that is related to the stored second diagnostic identifier, one or more processors configured to search the non-transitory computer-readable memory; and
program instructions stored on the non-transitory computer-readable memory and executable by the one or more processors to:
   receive a received first diagnostic identifier, a received second diagnostic identifier, and a request comprising a received vehicle identifier;
   in response to receiving the request, determine a circuit element identifier to include in a reply to the request by (i) making a determination that the received vehicle identifier matches or is mapped to the stored vehicle identifier, that the received first diagnostic identifier matches or is mapped to the stored first diagnostic identifier, and that the received second diagnostic identifier matches or is mapped to the stored second diagnostic identifier, and (ii) in response to making the determination, determining that the particular circuit element identifier is the circuit element identifier to include based on the particular circuit element identifier being mapped to the stored vehicle identifier, the stored first diagnostic identifier, and the stored second diagnostic identifier;
   generate the reply to include the determined circuit element identifier; and
   output the generated reply to the request.

28. A computing system according to claim 27, further comprising:
a network interface including a transceiver,
wherein the network interface is connected to the one or more processors, and
wherein the transceiver is operable to receive the request and to transmit the generated reply to a vehicle repair tool including a display.

* * * * *